(12) United States Patent
Woo et al.

(10) Patent No.: US 12,109,993 B2
(45) Date of Patent: Oct. 8, 2024

(54) VEHICLE CONTROL SYSTEM AND METHOD

(71) Applicant: Transportation IP Holdings, LLC, Norwalk, CT (US)

(72) Inventors: Derek K. Woo, Melbourne, FL (US); Travis Jarboe, West Melbourne, FL (US); Brian Lee Staton, Palm Bay, FL (US); Sanketh Bhat, Bengaluru (IN); Prem Kumar Patchaikani, Bengaluru (IN); Jayeshkumar Jayanarayan Barve, Bengaluru (IN); Saurabh Shamkant Dhamne, Bengaluru (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 18/183,128

(22) Filed: Mar. 13, 2023

(65) Prior Publication Data

US 2023/0331199 A1    Oct. 19, 2023

Related U.S. Application Data

(60) Provisional application No. 63/332,432, filed on Apr. 19, 2022.

(51) Int. Cl.
*B60T 8/17*      (2006.01)
*B61L 15/00*     (2006.01)
*B61L 25/02*     (2006.01)

(52) U.S. Cl.
CPC ........ *B60T 8/1705* (2013.01); *B61L 15/0094* (2024.01); *B61L 25/021* (2013.01); *B61L 2201/00* (2013.01)

(58) Field of Classification Search
CPC .. B60T 8/1705; B61L 15/0094; B61L 25/021; B61L 2201/00
See application file for complete search history.

(56) References Cited

U.S. PATENT DOCUMENTS

| | | |
|---|---|---|
| 6,314,345 B1 | 11/2001 | Coombes |
| 6,470,245 B1 | 10/2002 | Proulx |
| 6,789,004 B2 | 9/2004 | Brousseau et al. |
| 6,799,098 B2 | 9/2004 | Horst et al. |
| 6,853,890 B1 | 2/2005 | Horst et al. |
| RE39,011 E * | 3/2006 | Horst ................ B61L 3/126 246/187 A |
| 7,177,732 B2 | 2/2007 | Kraeling et al. |

(Continued)

FOREIGN PATENT DOCUMENTS

| WO | WO-2020077687 A1 * | 4/2020 | ............ B60T 8/1705 |
|---|---|---|---|
| WO | WO-2020260048 A1 * | 12/2020 | ............ B61L 25/021 |
| WO | WO-2021022705 A1 * | 2/2021 | ............ B60T 8/1705 |

*Primary Examiner* — Joseph J Dallo
(74) *Attorney, Agent, or Firm* — K&L Gates LLP

(57) ABSTRACT

A vehicle control system may determine a required tractive effort and/or a required braking effort to propel a vehicle system at a determined speed. The vehicle control system may determine a throttle setting or a brake setting to provide the required tractive effort and/or the required braking effort and communicate a control signal from a remote controller device to an onboard controller device. The vehicle control system may operate a propulsion system at the throttle setting and/or a brake system at the brake setting to move the vehicle system at the determined speed.

20 Claims, 13 Drawing Sheets

(56) References Cited

U.S. PATENT DOCUMENTS

| | | |
|---|---|---|
| 7,233,844 B2 | 6/2007 | Peltz et al. |
| 7,236,859 B2 | 6/2007 | Horst et al. |
| 7,520,472 B2 | 4/2009 | Peltz et al. |
| 7,653,465 B1 | 1/2010 | Geiger et al. |
| 7,729,818 B2 | 6/2010 | Wheeler et al. |
| 8,483,887 B2 | 7/2013 | Ecton et al. |
| 2005/0075764 A1 | 4/2005 | Horst et al. |
| 2007/0173990 A1 | 7/2007 | Smith et al. |
| 2019/0106135 A1 | 4/2019 | Kumar et al. |
| 2019/0176862 A1 | 6/2019 | Kumar et al. |
| 2020/0070790 A1* | 3/2020 | Staats ................ B60T 8/58 |

* cited by examiner

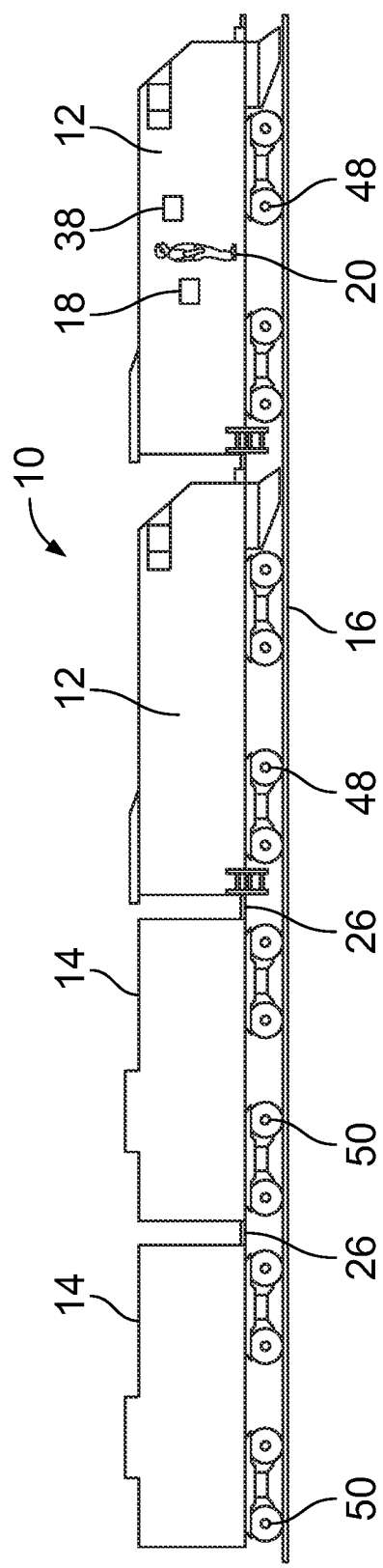
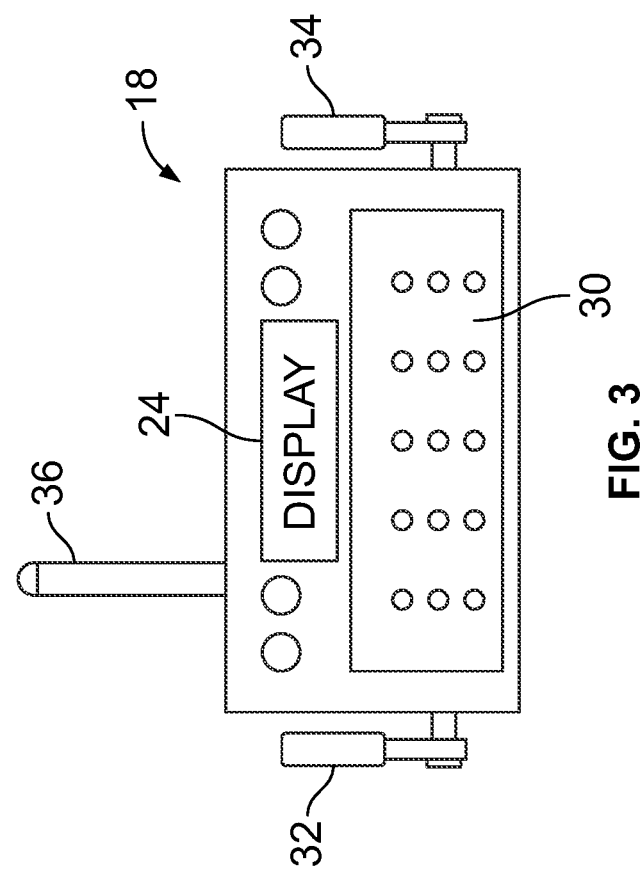
FIG. 2
FIG. 3

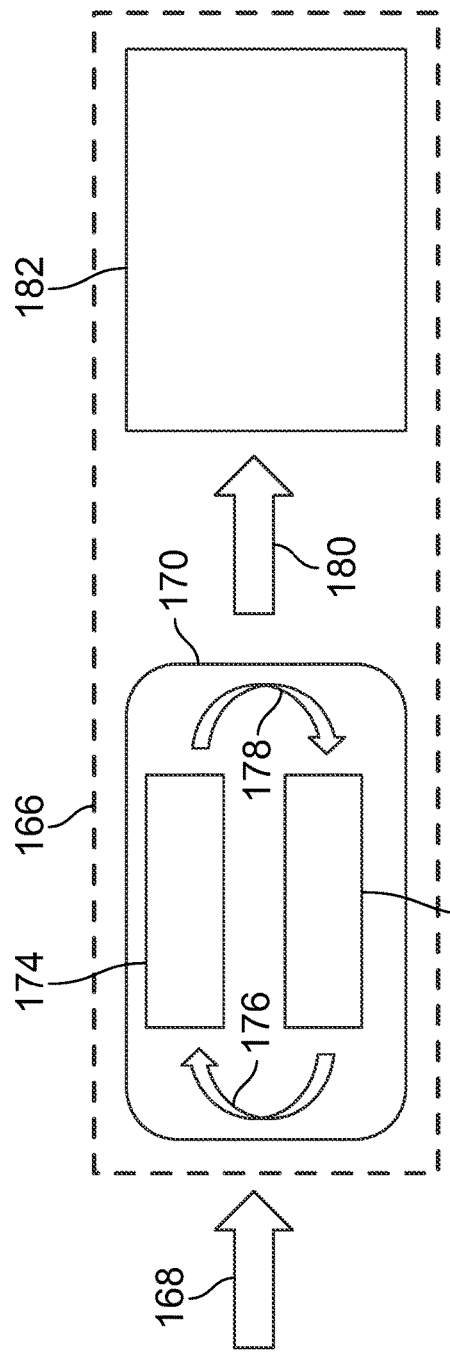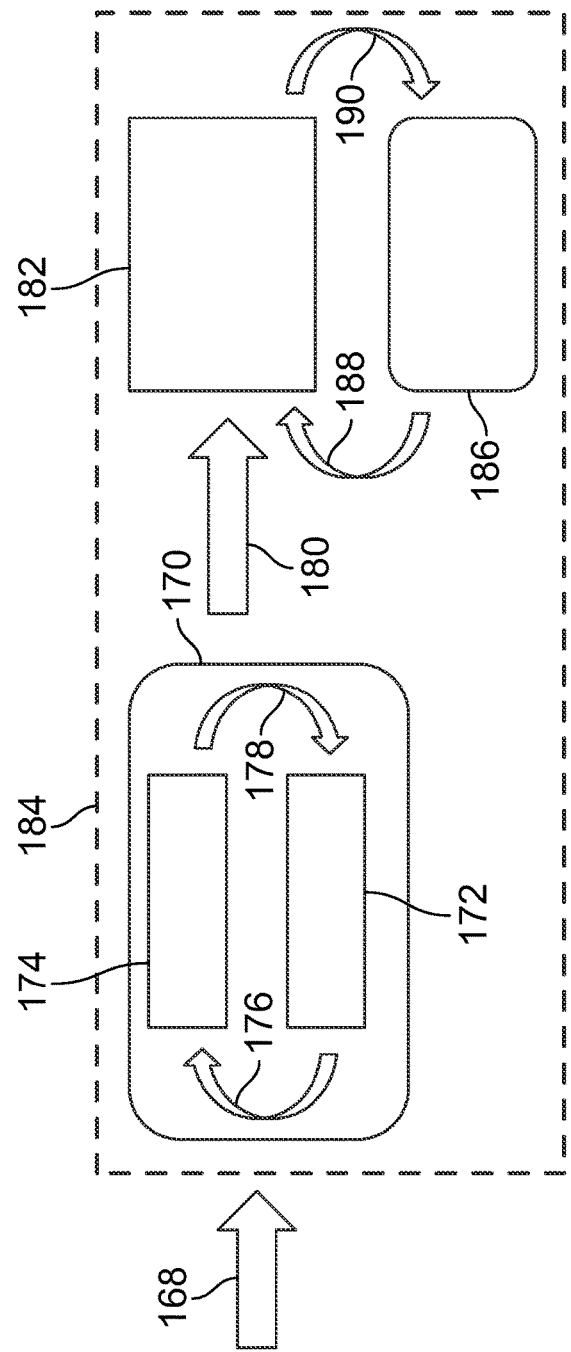

VEHICLE CONTROL SYSTEM AND METHOD

CROSS-REFERENCE TO RELATED APPLICATIONS

This application claims priority to U.S. Provisional Application No. 63/332,432 (filed 19 Apr. 2022), the entire disclosure of which is incorporated herein by reference.

BACKGROUND

Technical Field

The disclosed subject matter described herein relates to systems and methods for control of vehicle systems.

Discussion of Art

Remote control technology may be used to enable an operator to remotely control a vehicle system. For example, railway vehicles such as trains may be remotely controlled in a rail yard by a handheld operator control unit (OCU) for scenarios such as set outs, pick-ups, and locomotive movements in the yard. Remote control of rail vehicles in a rail yard can improve crew productivity, reduce car dwell time in the rail yard, reduce manpower for switching operations, and eliminate or reduce the need for a low-horse-power locomotive fleet.

Using remote control technology allows a single operator to conduct local pick-ups and drop-offs between origin and destination and set-out bad order cars. A single operator can bring stranded trains into congested rail yards if the road crews' time expires. Remote control technology also allows a yard-crew member to hostel mainline power around the yard, conduct switching operations, and build the train for departure. Mainline power can be used to build trains and conduct switching operations in the rail yard. Remote control technology can also be used in slow-speed loading and unloading operations, reducing the use of road crews, and improving the efficiency of operations.

It may be desirable to have a system and method that differs from those that are currently available.

BRIEF DESCRIPTION

In accordance with one example or aspect, a method may include determining one or more of a required tractive effort or a required braking effort to propel a vehicle system at a determined speed and determining one or more of a throttle setting of a propulsion system or a brake setting of a brake system of the vehicle system that will provide one or more of the required tractive effort or the required braking effort. The method may include communicating a control signal from a remote controller device to an onboard controller device of the vehicle system and operating one or more of the propulsion systems at the throttle setting or the brake system at the brake setting with the control signal to move the vehicle system at the determined speed.

In accordance with one example or aspect, a system may include one or more controllers. The one or more controllers may determine one or more of a required tractive effort or a required braking effort to propel a vehicle system at a determined speed and determine one or more of a throttle setting of a propulsion system or a brake setting of a brake system of the vehicle system that will provide one or more of the required tractive effort or the required braking effort. The one or more controllers may communicate a control signal from a remote controller device to an onboard controller device of the vehicle system and operate one or more of the propulsion system at the throttle setting or the brake system at the brake setting with the control signal to move the vehicle system at the determined speed.

In accordance with one example or aspect, a method may include calculating a first grade of a vehicle system. The vehicle system may include a propulsion system and a plurality of vehicles. The method may include estimating a second grade of the vehicle system and obtaining a third grade of the vehicle system from a database. The method may include determining from the first grade, the second grade, and third grade, a corrected grade of the vehicle system and determining from the corrected grade a required tractive effort of the propulsion system to propel the vehicle system at a determined speed.

BRIEF DESCRIPTION OF THE DRAWINGS

The subject matter may be understood from reading the following description of non-limiting embodiments, with reference to the attached drawings, wherein below:

FIG. 2 schematically depicts a system for remotely operating a vehicle system according to one embodiment;

FIG. 3 schematically depicts a remote controller device according to one embodiment;

FIG. 12 schematically depicts a system for remotely operating a vehicle system according to one embodiment;

FIG. 13 schematically depicts a system for remotely operating a vehicle system according to one embodiment;

DETAILED DESCRIPTION

Figure 1:
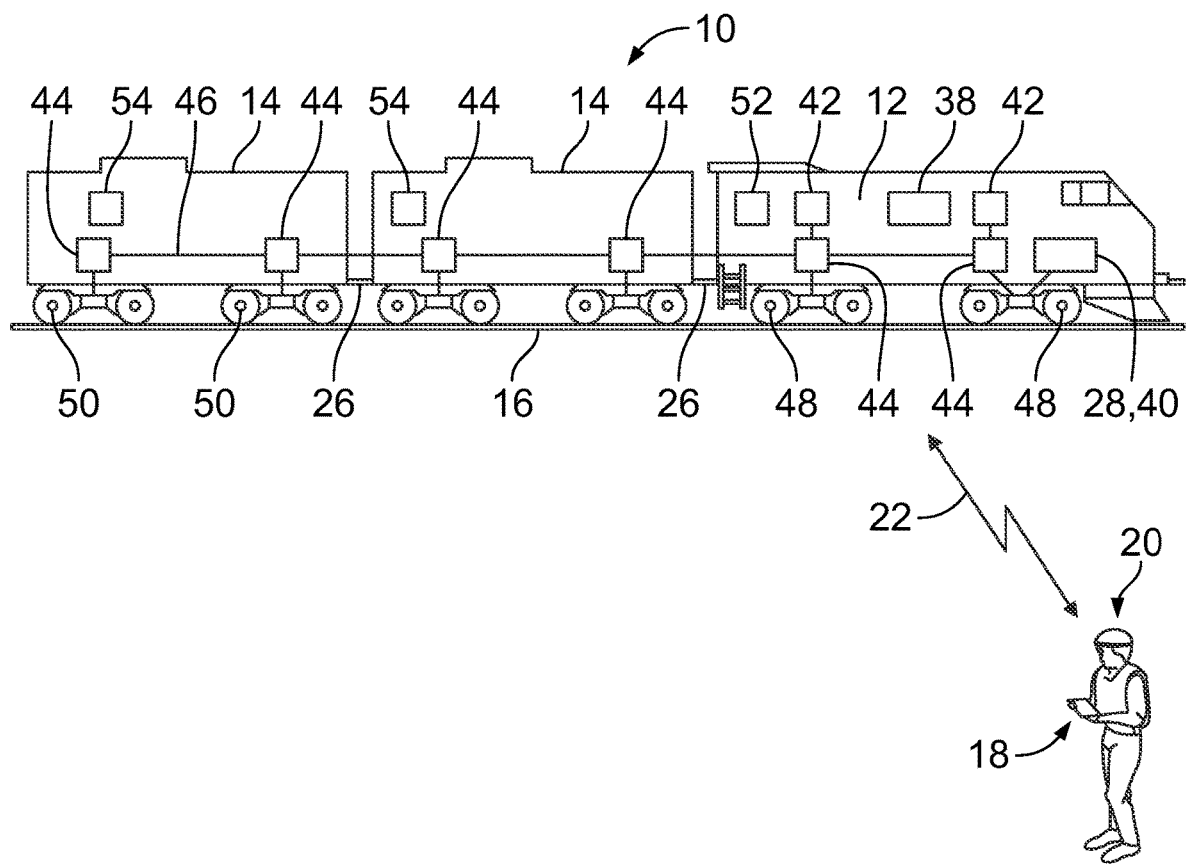
FIG. 1 schematically depicts a system for remotely operating of a vehicle system according to one embodiment.

Some vehicle-based industries are looking for advanced technologies like remote control of vehicles to save operational costs, improve productivity and efficiency, increase automation, and increase safety. For example, in a mine, an operator may manually drive a mining vehicle for a forward journey to a direction, but for the return journey, the operator may sit in the vehicle and use a remote control to drive the mining vehicle (e.g., a mining train) backward, thereby increasing productivity improvement by enabling more trips.

Traditionally, remote control of vehicles in which operators can be located has been primarily used in yard operations. The benefit of extending use of remote control of vehicles in road and mainline applications outside of the yard is that it can be used by lesser skilled or trained operators.

The subject matter described herein relates to systems and methods that can use a speed controller for a road remote control system with a few mile route look ahead (e.g., the controller or person remotely controlling the vehicle system may only have knowledge of the grade(s) in the route for a limited distance, such as no more than five miles ahead. This information can be repeatedly updated, such as every two minutes or another interval. Several examples of control architectures are provided herein, including feedback with grade correction, feedforward and feedback, MIMO controllers, etc. The speed controllers or devices described herein can be used to operate a vehicle or vehicle system from start to stop using throttle, dynamic brakes, and independent brakes with limited ahead route information. Stated differently, the controller may ensure the vehicle or vehicle system starts smoothly, as well as regulate the vehicle system at a commanded speed and apply brakes to stop when commanded. While doing this, the controller may ensure that the vehicle system does not exceed the speed limits and safety limits of couplers, maintain good handling in terms of inter-vehicle forces in the vehicle system, etc.

Embodiments of the subject matter described herein relate to systems and methods for remotely operating a vehicle system that includes a plurality of vehicles. The vehicle system may be operated remotely by an operator through a remote controller device. The vehicle system may be operated outside of a facility, such as a rail yard for example in the case of railway vehicles. The vehicle system may be operated at higher speeds and on mainline routes of the vehicle system for activities including set out, pick up, and/or repairs. The speed of the vehicle system may be regulated even if the composition of the vehicle system, the weight of the vehicle system, and/or the grade of the surface that the vehicle system is on are not known or incorrectly determined.

The speed of the vehicle system may be regulated during starting from zero speed. The speed may be regulated even if an operator enters incorrect or no information on the vehicle system weight, the vehicle system composition, or the initial grade. The speed of the vehicle system may be regulated from zero speed (i.e., from starting or another stopped or stationary state), during acceleration, during deceleration, and at different speeds, for example up to 70 mph. The speed of the vehicle system may also be regulated, by either accelerating or decelerating, from one target speed to another target speed. The speed of the vehicle system may also be regulated by decelerating to zero speed (i.e., stopping or reaching a fully stationary state). The speed of the vehicle system may also be regulated to maintain coupler forces between the vehicles within limits.

An open loop control may be used for starting the vehicle system. Open loop control may also be used for regulating the speed of the vehicle system during stopping, for example during coast-to-idle or coast-to-brake modes of operation. Closed loop control may be used to regulate the speed of the vehicle system. The closed loop control may use Proportional-Integral-Derivative (PID) control.

While one or more embodiments are described in connection with a rail vehicle system, not all embodiments are limited to rail vehicle systems. Unless expressly disclaimed or stated otherwise, the subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) may be formed from a single vehicle or multiple vehicles. With respect to multi-vehicle systems, the vehicles may be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy, platoon, swarm, fleet, and the like). One or more (or all) embodiments described herein may relate to full size vehicles and not model or toy vehicles. For example, the subject matter described herein may not relate to scale Z, N, HO, S, O, or G model trains, but may relate to full-sized vehicles in which normal or average sized human beings can board, travel inside of, and disembark from.

Referring to FIG. 1, a vehicle system 10 can include a propulsion-generating vehicle 12 and optionally one or more non-propulsion generating vehicles 14 mechanically coupled together by couplers 26 while the vehicle system moves along a route 16. Alternatively, the vehicle system may be formed from a single propulsion-generating vehicle. In multi-vehicle systems, the vehicles may be mechanically coupled with each other or may be separate from each other (with communication between the vehicles allowing the vehicles to coordinate movements so that the vehicles move together as a convoy). The non-propulsion-generating vehicles may be configured to carry one or more human passengers or other cargo. According to one embodiment, the route may be in a facility, such as a railyard, or may be a main line route of a rail network for trains. The vehicle system can represent or be referred to as a vehicle group. According to one embodiment, the vehicle group may include plural propulsion-generating vehicles (FIG. 2) and optionally one or more non-propulsion-generating vehicles. According to one embodiment, the vehicle system may include plural propulsion-generating vehicles separated by plural non-propulsion-generating vehicles in a distributed power (DP) arrangement.

While the description herein describes a vehicle system being a rail vehicle group having locomotives as the propulsion-generating vehicles and railcars as the non-propulsion-generating vehicles (and the vehicle system may be a train), alternatively, one or more embodiments described herein may be applied to other types of vehicle systems and/or vehicles. These other vehicle groups may include one or more off-highway vehicles (e.g., mining vehicles or other vehicles that may be not designed or legally permitted for travel on public roadways), marine vessels, automobiles, trucks, aircraft, or the like. Additionally, the vehicle system may be formed from a single vehicle instead of multiple vehicles. Optionally, in a vehicle system formed from several vehicles, the vehicles may be mechanically separate from each other but virtually or logically coupled with each other in that the vehicles communicate with each other to coordinate their movements with each other (so that the separate vehicles move together as a larger vehicle system, or convoy, along the routes).

Each propulsion-generating vehicle may include a propulsion system 28. The propulsion system may include on or more traction motors operably coupled with axles and/or wheels of the propulsion-generating vehicles. The traction motors may be connected with the axles and/or wheels via one or more gears, gear sets, or other mechanical devices to transform rotary motion generated by traction motors into rotation of the axles and/or wheels to propel the vehicles and, consequently, the vehicle system. Different traction motors may be operably connected with different axles and/or wheels such that traction motors that may be deactivated (e.g., turned off) do not rotate corresponding axles and/or wheels while traction motors that remain activated (e.g., turned on) rotate corresponding axles and/or wheels.

The one or more propulsion generating vehicles can include an onboard controller device 38. The onboard controller device may include a Proportional-Integral-Derivative (PID) controller or another type of controller. The onboard controller device may include one or more processors (e.g., integrated circuits, microprocessors, field programmable gate arrays, etc.) and a tangible and non-transitory computer readable memory that stores instructions executable by the processor(s). The memory may also store data, including data received during operation of the vehicle system, for example while operated by remote control. The onboard controller device may also include a display that may display information to an operator of the vehicle system and an input device, such as a touch screen or keyboard.

An operator 20 may remotely control operation of the vehicle system with a remote controller device, or OCU 18. The remote controller device may send and receive signals 22 to and from one or more of the propulsion-generating vehicles. As shown in FIG. 1, the operator may be offboard the vehicle system while remotely controlling the vehicle system. As shown in FIG. 2, the operator may be onboard the vehicle system while remotely controlling the vehicle system (e.g., onboard the same vehicle being controlled or onboard another vehicle in the same vehicle system as the vehicle being remotely controlled). Referring to FIG. 3, the remote controller device can include a display 24 and an input interface 30 that allow the operator to input instructions to remotely control the one or more propulsion generating vehicles. The input interface may include switches or buttons or may be a keyboard or touch screen interface that accepts inputs from the operator.

The remote controller device may include a brake input (e.g., lever, button, or switch) 32 and a throttle input (e.g., lever, button, or switch) 34. The throttle input may allow the operator to increase the speed of the vehicle system by adjusting the throttle input. According to one embodiment, the throttle input may be adjusted from one discrete power setting, or notch, to another discrete power setting. According to one embodiment, the throttle input may be adjusted in a continuous manner. The remote controller device includes an antenna 36 that can wirelessly send signals to the onboard controller device 38 onboard one or more of the propulsion-generating vehicles.

The propulsion-generating vehicle can include a brake, such as an independent braking system 42, that brakes wheels 48 of the propulsion-generating vehicle. The propulsion-generating vehicle also may include a dynamic braking system 40. The dynamic brake system can represent the traction motors operating in a regenerative braking mode to slow or stop movement of the vehicle. The vehicle system may further include an automatic braking system 44 for braking wheels 50 of the non-propulsion generating vehicles and the wheels of the propulsion-generating vehicle(s). The automatic braking system may include a brake pipe 46 that carries pressurized brake fluid (e.g., air) to activate the brakes for the wheels. The automatic brake system may be an Electronically Controlled Pneumatic (ECP) brake system that may be controlled by the onboard controller device.

Sensors 52 may be provided on the one or more propulsion-generating vehicles and sensors 54 may be provided on the one or more non-propulsion-generating vehicles. The sensors may communicate by wire(s) or wirelessly with the onboard controller device(s) of the one or more propulsion-generating vehicles. The sensors may provide visual data and sensor data. The sensors may include, but are not limited to, optical sensors such as digital video cameras, speed sensors, temperature sensors, oil pressure sensors, voltage sensors, current sensors, brake line pressure conveyed via end-of-train telemetry, operator input/output device status, and other locomotive sensors. Additional data that may be made available by sensors include, but not limited to, power notch setting, braking commands, and outputs of various engineer aids such as data produced by trip or rail network scheduling or optimizing systems. Other types of sensors that may provide data also include, but are not limited to, microphones, an accelerometer, digital thermometers, and location detection sensors, such as an on-board GPS system.

The remote controller device can receive input from an operator or other system, generate control signals based on the input, and wirelessly communicate the control signals to the onboard controller device to control movement of the vehicle system while the vehicle system moves along one or more routes, including one or more main line routes. As shown in FIG. 1, the remote controller device may receive the input from the operator, generate the control signals, and wirelessly communicate the control signals while the remote controller device is offboard the vehicle system. As shown in FIG. 2, the remote controller device can receive the input from the operator, generate the control signals, and wirelessly communicate the control signals while the remote controller device is onboard the vehicle system. The operator may be, or may not be, a certified or licensed locomotive operator. Optionally, the input may be received from a computerized system, such as an energy management system, a vehicle controller, a vehicle control unit, a dispatch facility, or the like.

The onboard controller device can change a throttle setting of the propulsion system of the vehicle system to change the movement of the vehicle system based on the input that is received. The onboard controller device may change a dynamic brake setting of the propulsion system of the vehicle system to change the movement of the vehicle system based on the input that is received. The onboard controller device may change an independent brake setting of the brake system of the vehicle system to change the movement of the vehicle system based on the input that is received.

The remote controller device can receive input from the operator of the remote controller device or from another database, system, or the like. One input may be a weight, mass, or size of the vehicle system and the remote controller device can generate control signals based on the weight, mass, or size of the vehicle system. Another example of input may be a grade on which the vehicle system is disposed and the remote controller device can generate the control signals based on the grade (e.g., to prevent the vehicle system from undesirably rolling down the grade, to ensure the vehicle system generates enough propulsion and/or braking to prevent rolling down the grade, to ensure the vehicle system generates enough propulsion to move up the grade, to cause dynamic braking of the vehicle system to charge or power electric loads with energy obtained from the dynamic braking, etc.).

The remote controller device can receive one or more of a first number of propulsion-generating vehicles in the vehicle system and/or a second number of non-propulsion-generating vehicles in the vehicle system as the input. The remote controller device can generate the control signals based on the first number and/or the second number. If the vehicle system includes multiple propulsion-generating vehicles, the onboard controller device may synchronously control settings of one or more of the propulsion systems or the brake systems onboard the multiple propulsion-generating vehicles based on the control signals received from the remote controller device. For example, the onboard controller device can direct the vehicles to implement the same changes in throttle and/or brake settings at the same time.

The remote controller device can receive a speed set point as the input and generate the control signals based on the speed set point. This can direct the vehicle system to move at a speed associated with or indicated by the set point.

The onboard controller device can monitor inter-vehicle forces within the vehicle system, for example from sensors that determine forces on the couplers, and control one or more of the propulsion system or the brake system based on the control signals received from the remote controller device. This can reduce the inter-vehicle forces or maintain the inter-vehicle forces within a designated range, such as by slowing down or speeding up one or more of the vehicles in the vehicle system (relative to one or more other vehicles in the vehicle system).

The onboard controller device can restrict a frequency at which a throttle setting of the propulsion system is changed based on the control signals that may be received from the remote controller device. For example, the onboard controller device may not allow or may not send signals that change a throttle setting of a vehicle more often than a designated frequency. The onboard controller device may engage a dynamic brake of the brake system of the vehicle system responsive to the control signals received from the remote controller device directing the onboard controller device to stop the movement of the vehicle system.

The onboard controller device may include a PID controller that uses a first set of control gains above a designated speed and a different, second set of control gains that change as a function of one or more operational parameters. The operational parameters can include one or more of a weight of the vehicle system, a speed of the vehicle system, or a grade of the route on which the vehicle system is located.

The onboard controller device may receive a current commanded speed that the vehicle system is to move. The onboard controller device can determine a current moving speed at which the vehicle system is moving and calculate a reference shaped speed at which a propulsion system and/or a brake system of the vehicle system is directed to change the current moving speed of the vehicle system to approach or move closer to the current commanded speed.

The reference speed determined by the onboard controller device may be based on a reference shaping model that changes the reference speed based on relative values of the current commanded speed, a previous commanded speed that the vehicle system previously was commanded to move, the current moving speed of the vehicle system, and/or a previous reference shaped speed. The onboard controller device can control the one or more of the propulsion system or the brake system to operate to cause the vehicle system to move at the reference shaped speed that is calculated.

The onboard controller device may calculate the reference shaped speed by linearly increasing or linearly decreasing a previous value of the reference shaped speed. The reference shaped speed may be calculated by increasing or decreasing a previous value of the reference shaped speed at a rate that changes based on one or more of (a) a first difference between a current value of the reference shaped speed and the current commanded speed and/or (b) a second difference between the current moving speed of the vehicle system and one or more of the reference shaped speed or the current commanded speed. The onboard controller device can calculate a faster value for the rate while the difference between the current value of the reference shaped speed and the current commanded speed is larger and a slower value while the difference between the current value of the reference shaped speed and the current commanded speed is smaller.

The onboard controller device can calculate a first designated value for the rate while the difference between the current value of the reference shaped speed and the current commanded speed is larger than a designated value, and a second designated value for the rate that is slower than the first designated value while the difference between the current value of the reference shaped speed and the current commanded speed is no larger than the designated value.

The onboard controller device can calculate the reference shaped speed by increasing or decreasing a previous value of the reference shaped speed at a first rate then a faster, second rate, followed by a slower, third rate. The onboard controller device may calculate the reference shaped speed by increasing or decreasing a previous value of the reference shaped speed according to a time invariant first order model. The onboard controller device may calculate the reference shaped speed by changing a previous value of the reference shaped speed according to a rate that is based on one or more of a weight of the vehicle system and the current moving speed.

The onboard controller device can calculate a faster value for the rate while the difference between the current value of the reference shaped speed and the current commanded speed is larger and a slower value while the difference between the current value of the reference shaped speed and the current commanded speed is smaller.

The onboard controller device can receive the current commanded speed from an operator input device, for example from the remote controller device. The onboard controller device may receive the current commanded speed from an automated control system.

Figure 4:
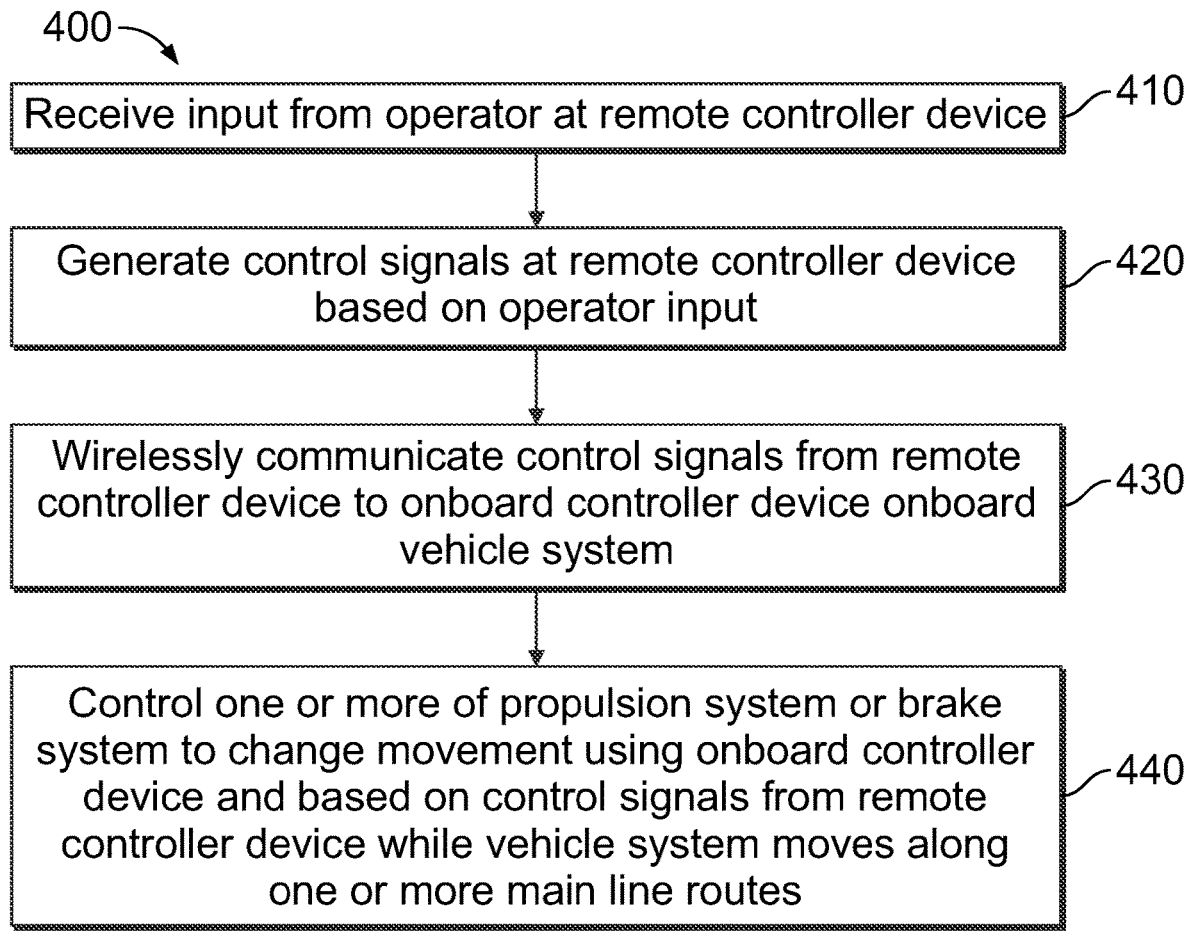
FIG. 4 schematically depicts a method according to one embodiment.

Referring to FIG. 4, a method 400 may include receiving input from an operator at a remote controller device of a vehicle control system at step 410 and generating control signals at the remote controller device based on the input from the operator at step 420. The method may include wirelessly communicating the control signals from the remote controller device to an onboard controller device disposed onboard a vehicle system at step 430 and controlling one or more of a propulsion system or a brake system of the vehicle system to change movement of the vehicle system using the onboard controller device and based on the control signals that may be received from the remote controller device while the vehicle system moves along one or more main line routes at step 440.

According to one embodiment, controlling the one or more of the propulsion system or the brake system can include changing a throttle setting of the propulsion system.

Controlling the one or more of the propulsion system or the brake system may include changing a dynamic brake setting of the propulsion system. Controlling the one or more of the propulsion system or the brake system may include changing an independent brake setting of the brake system. Controlling the one or more of the propulsion system or the brake system may include controlling the movement of the vehicle system to move at speeds that exceed fifteen miles per hour.

According to one embodiment, receiving the input, generating the control signals, wirelessly communicating the control signals, and controlling the one or more of the propulsion system or the brake system occurs may occur while the remote controller device is offboard the vehicle system. According to one embodiment, receiving the input, generating the control signals, wirelessly communicating the control signals, and controlling the one or more of the propulsion system or the brake system occurs may occur while the remote controller device is onboard the vehicle system.

According to one embodiment, the vehicle system includes at least a first propulsion-generating vehicle that includes the propulsion system and a second non-propulsion-generating vehicle, and receiving the input, generating the control signals, wirelessly communicating the control signals, and controlling the one or more of the propulsion system or the brake system occurs while the remote controller device is onboard the non-propulsion-generating vehicle of the vehicle system.

According to one embodiment, the input that may be received by the remote controller device includes one or more of a weight of the vehicle system, a grade on which the vehicle system is disposed, a first number of propulsion-generating vehicles in the vehicle system, a second number of non-propulsion-generating vehicles in the vehicle system, or a speed set point.

According to one embodiment, controlling the one or more of the propulsion system or the brake system includes adaptively limiting a frequency based on a controller mode at which a throttle setting of the propulsion system may be changed based on the control signals that may be received from the remote controller device.

According to one embodiment, the one or more of the propulsion system or the brake system includes engaging a dynamic brake of the brake system of the vehicle system responsive to the control signals received from the remote controller device directing the onboard controller device to stop the movement of the vehicle system.

Figure 5:
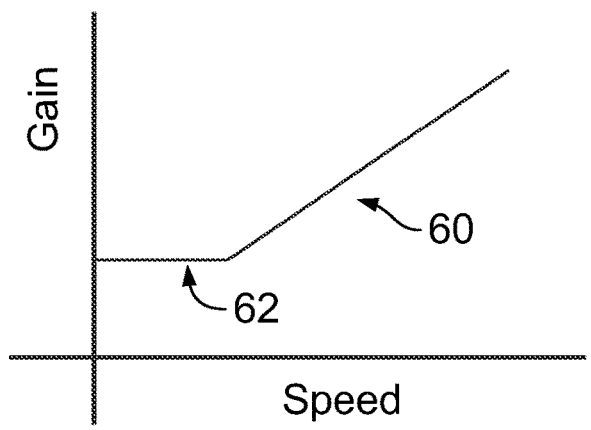
FIG. 5 schematically depicts a relationship between a gain of a closed loop control and a speed of the vehicle system.

According to one embodiment, controlling the one or more of the propulsion system or the brake system includes clamping a control gain that may be output by a proportional-integral-derivative (PID) controller of the onboard controller device to the propulsion system of the vehicle system at speeds of the vehicle system that may be slower than a designated speed limit. Referring to FIG. 5, the closed loop gain 60 may be scheduled with respect to the mass of the vehicle system and the speed of the vehicle system. At low speeds, the gain value becomes too low. At low speeds the gain may be kept at a threshold gain 62. By clamping the gain, undershoot and overshoot of the speed may be reduced, on both ascending and descending grades.

Controlling the one or more of the propulsion system or the brake system may include transitioning from an open loop control mode to a closed loop control mode responsive to the vehicle system reaching the designated speed limit.

Figure 6:
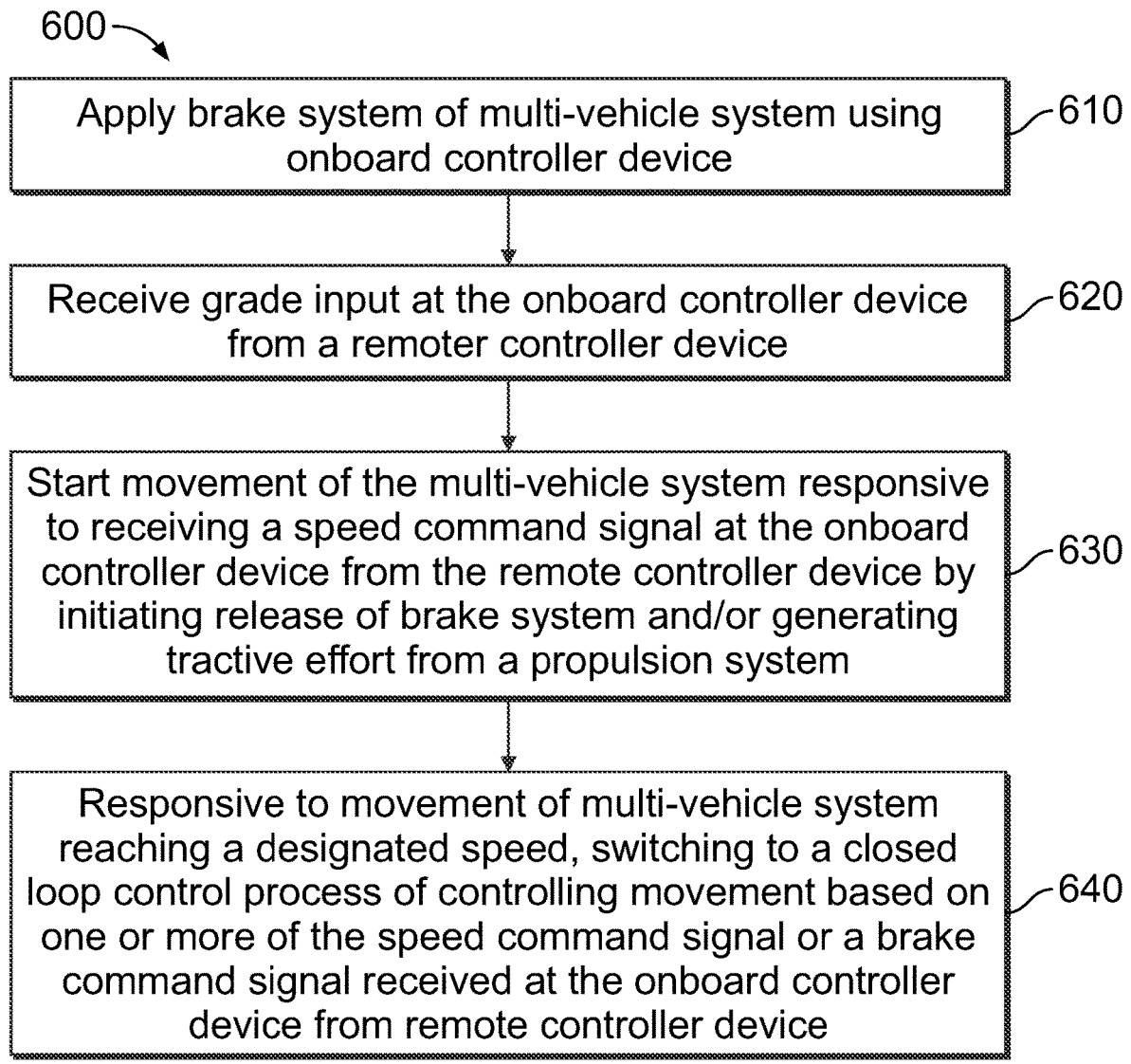
FIG. 6 schematically depicts a method according to one embodiment.

Referring to FIG. 6, a method 600 may include applying a brake system of a multi-vehicle system using an onboard controller device of the multi-vehicle system at step 610 and receiving grade input at the onboard controller device from a remote controller device at step 620. The grade input indicates a grade of a surface on which the multi-vehicle system may be disposed. The method further includes starting movement of the multi-vehicle system responsive to receiving a speed command signal at the onboard controller device from the remote controller device at step 630. The movement of the multi-vehicle system may be started by initiating release of the brake system and/or generating tractive effort from a propulsion system of the multi-vehicle system. Starting the movement of the multi-vehicle system stretches the multi-vehicle system. The method further includes, responsive to the movement of the multi-vehicle system reaching a designated speed, switching to a closed loop control process of controlling the movement of the multi-vehicle system based on one or more of the speed command signal or a brake command signal received at the onboard controller device from the remote controller device at step 640.

According to one embodiment, the grade input that may be received at the onboard controller device indicates that the multi-vehicle system may be on an ascending grade, and the method further includes maintaining application of the brake system while concurrently increasing the tractive effort that may be generated by the propulsion system and determining whether the multi-vehicle system may be rolling backward down the ascending grade. Responsive to determining that the multi-vehicle system may be not rolling backward down the ascending grade, the method further includes releasing the brake system while continuing to generate the tractive effort at a first threshold level. Responsive to determining that the multi-vehicle system may be rolling backward down the ascending grade, the method further includes maintaining application of the brake system while concurrently generating the tractive effort at a second threshold level that may be greater than the first threshold level.

According to one embodiment, the grade input that may be received at the onboard controller device indicates that the multi-vehicle system may be on a flat grade, and the method further includes releasing the brake system at a configurable slew rate and concurrently generating the tractive effort with the propulsion system until the multi-vehicle system may be stretched or the multi-vehicle system is moving forward.

According to one embodiment, the grade input that may be received at the onboard controller device indicates that the multi-vehicle system may be on a descending grade, and the method further includes verifying that one or more traction motors of the propulsion system may be set up for dynamic braking, releasing the brake system at a configurable slew rate, and determining whether the multi-vehicle system is moving forward. Responsive to determining that the multi-vehicle system may be moving forward, the method further includes engaging the one or more traction motors to dynamically brake to keep a moving speed of the multi-vehicle system to be no faster than the designated speed.

According to one embodiment, the method further includes determining that the multi-vehicle system may be rolling backward in contradiction to the grade input that was received and engaging the brake system to stop the multi-vehicle system from rolling backward. The method further includes building up generation of the tractive effort provided by the propulsion system while concurrently engaging the brake system until the multi-vehicle system no longer rolls backward and releasing the brake system.

According to one embodiment, the closed loop control process of controlling the movement of the multi-vehicle system includes maintaining a speed of the multi-vehicle system at or within a threshold range of the speed command signal by alternating between (a) dynamically braking the multi-vehicle system using the propulsion system of the multi-vehicle system and (b) setting a throttle of the propulsion system to idle while the speed of the multi-vehicle system exceeds a designated stall speed of the multi-vehicle system to maintain the movement of the multi-vehicle. The method further includes applying the brake system of the multi-vehicle system responsive to (c) receiving an updated speed command signal at the onboard controller device from the remote controller device that reduces the speed of the multi-vehicle system and (d) the speed of the multi-vehicle system reaching the stall speed.

According to one embodiment, the brake system of the multi-vehicle system includes independent brakes, and the closed loop control process of controlling the movement of the multi-vehicle system includes maintaining a speed of the multi-vehicle system at or within a threshold range of the speed command signal by alternating between (a) applying the independent brakes of the multi-vehicle system and (b) setting a throttle of the propulsion system to idle while the speed of the multi-vehicle system exceeds a designated stall speed of the multi-vehicle system to maintain the movement of the multi-vehicle. The method further includes applying the independent brakes of the multi-vehicle system responsive to (c) receiving an updated speed command signal at the onboard controller device from the remote controller device that reduces the speed of the multi-vehicle system and (d) the speed of the multi-vehicle system reaching the stall speed.

Figure 7:
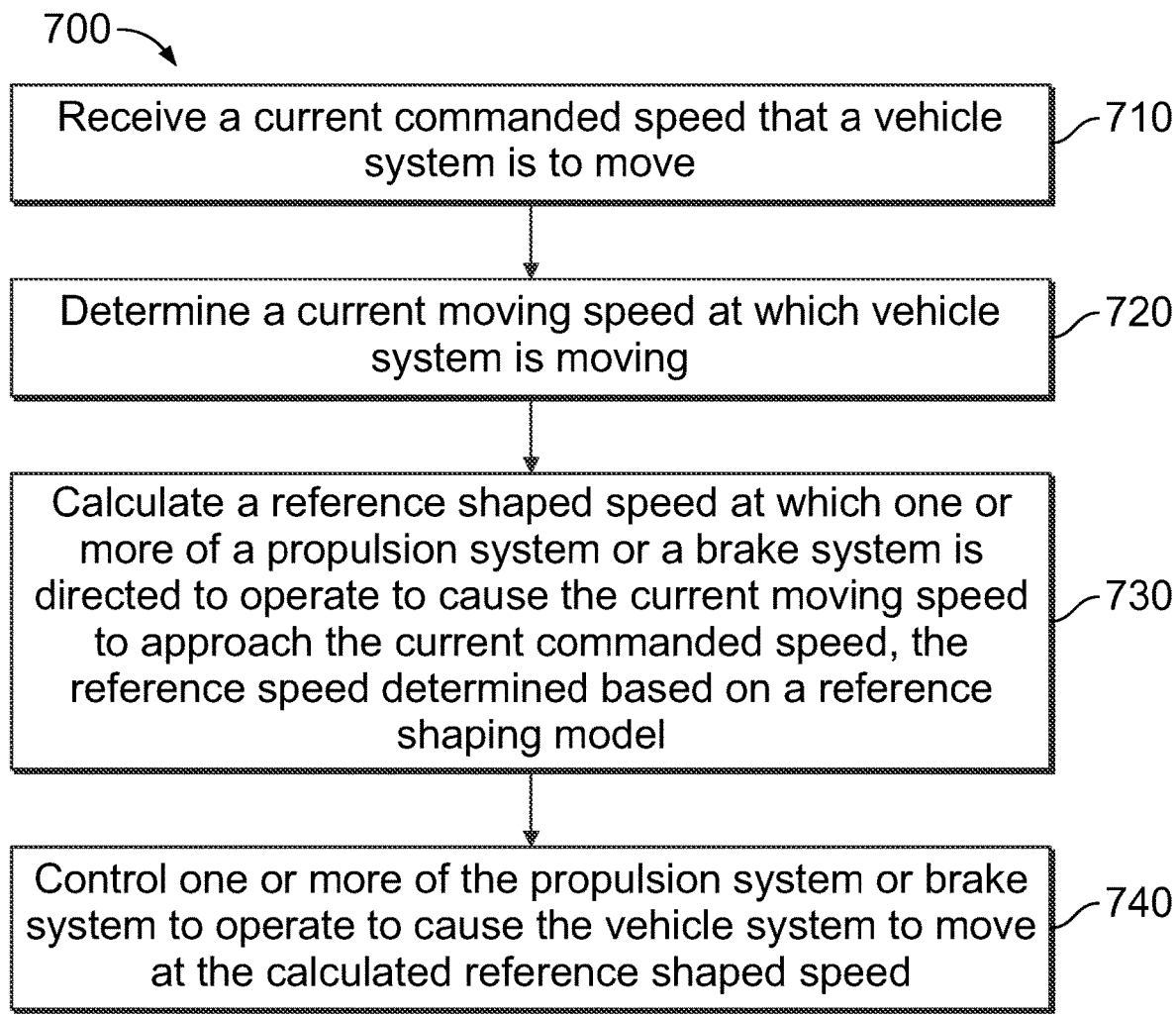
FIG. 7 schematically depicts a method according to one embodiment.
Figure 8:
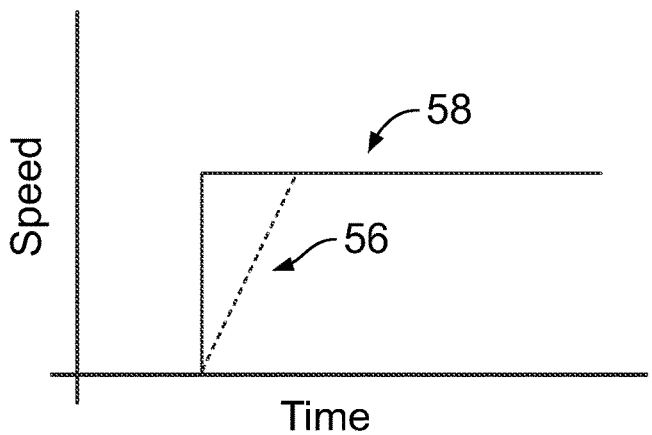
FIG. 8 schematically depicts a relationship between a current commanded speed of the vehicle system and a reference shaped speed.

Referring to FIG. 7, a method 700 may include receiving a current commanded speed that a vehicle system is to move at step 710 and determining a current moving speed at which the vehicle system may be moving at step 720. To reduce undershoot and overshoot, the current commanded speed may be increased and decreased gradually at a configurable slew rate of the onboard controller device. The method further includes calculating a reference shaped speed at which one or more of a propulsion system or a brake system of the vehicle system may be directed to operate to cause the current moving speed of the vehicle system to approach the current commanded speed at step 730. Referring to FIG. 8, the reference shaped speed 56 can be calculated to approach the current commanded speed 58. The reference speed may be determined based on a reference shaping model that changes the reference speed based on relative values of the current commanded speed, a previous commanded speed that the vehicle system previously was commanded to move, and the current moving speed of the vehicle system. Referring again to FIG. 7, the method further may include controlling the one or more of the propulsion system or the brake system to operate to cause the vehicle system to move at the reference shaped speed that may be calculated at step 740.

According to one embodiment, the reference shaped speed may be calculated by linearly increasing or linearly decreasing a previous value of the reference shaped speed.

According to one embodiment, the reference shaped speed may be calculated by increasing or decreasing a previous value of the reference shaped speed at a rate that changes based on a difference between a current value of the reference shaped speed and the current commanded speed. The rate may be faster when the difference between the current value of the reference shaped speed and the current commanded speed may be larger, and the rate may be slower when the difference between the current value of the reference shaped speed and the current commanded speed is smaller. The rate may be a first designated rate when the difference between the current value of the reference shaped speed and the current commanded speed is larger than a designated value and the rate is a second designated rate that is slower than the first designated rate when the difference between the current value of the reference shaped speed and the current commanded speed is no larger than the designated value.

According to one embodiment, the reference shaped speed may be calculated by increasing or decreasing a previous value of the reference shaped speed according to a time invariant first order model. According to one embodiment, the reference shaped speed may be calculated by changing a previous value of the reference shaped speed at a rate that changes based on one or more of a weight of the vehicle system and the current moving speed. According to one embodiment, the current commanded speed may be received from an operator input device, for example from the remote controller device or the onboard controller device. According to one embodiment, the current commanded speed may be received from an automated control system.

Figure 9:
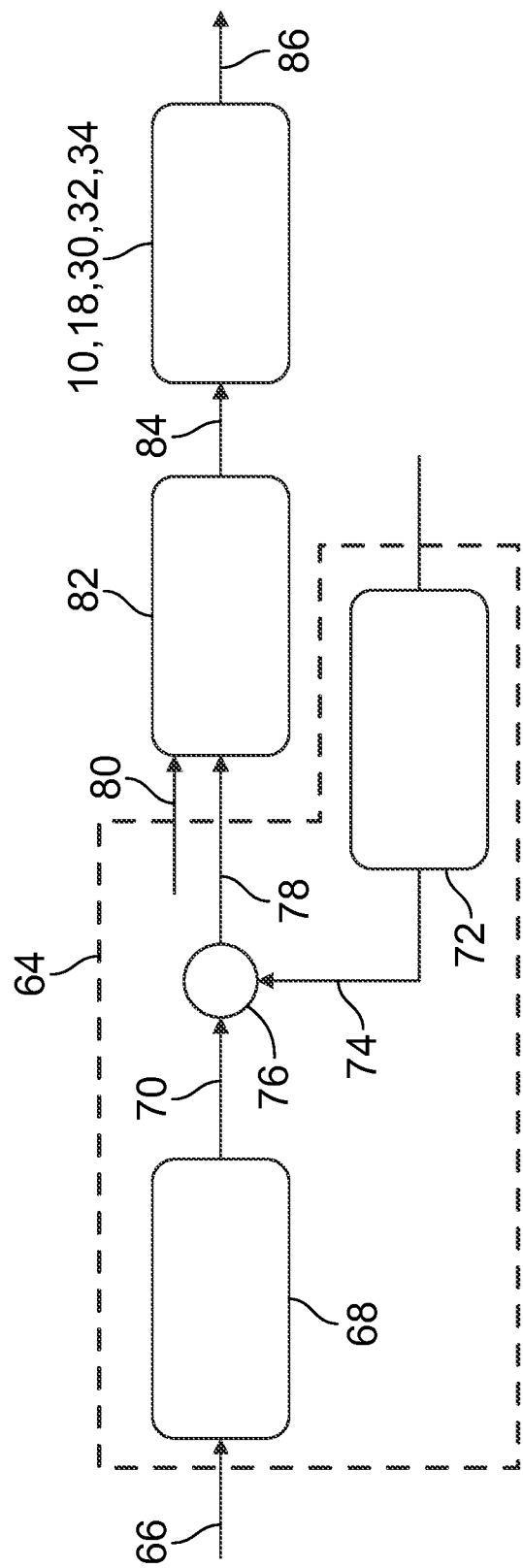
FIG. 9 schematically depicts a system for remotely operating a vehicle system according to one embodiment.

Referring to FIG. 9, a system 64 may include one or more controllers. The one or more controllers may be provided in one or more of the operator control unit or the vehicle system. According to one embodiment, the one or more controllers may be provided in one or more onboard controllers of one or more propulsion-generating vehicles of a vehicle system that includes one or more propulsion-generating vehicles. According to one embodiment, the one or more controllers may be PI controllers. According to one embodiment, the one or more controllers may be PID controllers.

The system may include a tractive effort (TE) calculation module 68 to calculate a tractive effort required to propel or move the vehicle system at a determined speed. According to one embodiment the determined speed may be in a range of 2 mph to 70 mph. According to one embodiment the determined speed may be in a range of 2 mph to 35 mph. The required tractive effort may be achieved from operation of the propulsion system(s) and the brake system(s) of the vehicle system. The TE calculation module may receive as an input a grade 66 of the vehicle which may represent a grade on which the vehicle system may be disposed. The grade of the vehicle system may be determined from a database. The database may be onboard the vehicle system or may be accessible from a remote location by the vehicle system. According to one embodiment, the vehicle system may be a rail vehicle such as a train and can include a positive train control (PTC) system that includes a database of routes. The database may include information of grades of the routes that the vehicle system may travel. The database may include information on travel routes and grades along the travel routes of a transportation network that the vehicle system may be operated in.

The system may access the database to determine a current grade of the vehicle system and an upcoming grade of the vehicle system for a determined distance and/or determined time. According to one embodiment, the system may access, or look ahead at, grades that the vehicle system will encounter along a travel route for a determined distance. According to one embodiment, the system may access, or look ahead at, grades that the vehicle system will encounter at five miles. According to one embodiment, the system may access, or look ahead at, grades the vehicle system will encounter along a route of travel for a determined time of one minute. According to one embodiment, the system may determine an upcoming grade of the vehicle system every one tenth of a mile and/or every 30 seconds.

The grade may be determined by measurement instruments. The grade determined by the measurement instruments may be an instantaneous grade of the vehicle system. According to one embodiment, the vehicle system may include barometers that may be used to determine an elevation of a plurality of portions of the vehicle system. According to one embodiment, a lead vehicle of the vehicle system may include a barometer and an end vehicle may include a barometer. According to one embodiment, the vehicle system may include barometers on multiple vehicles of the vehicle system between the lead vehicle and the end vehicle. According to one embodiment, the vehicle system may include altimeters on vehicles of the vehicle system to determine the grade of the vehicle system. According to one embodiment, the vehicle system may include a Global Navigation Satellite System (GNSS), such as a Global Positioning System (GPS), to determine the position and grade of the vehicle system. The system may determine from the instantaneous grade an effective grade of the vehicle system that may be dependent on a grade profile of the vehicle system in the current location of the vehicle system. The effective grade may be determined from the instantaneous grade, the length of the vehicle systems (e.g. the number of vehicles in the vehicle system), and the weight of the vehicle system.

The TE calculation module determines the required tractive effort 70 by determining a force required to move or propel the vehicle system at the determined speed plus a grade force and a drag force on the vehicle system. The TE calculation module may receive the instantaneous grade or the effective grade of the vehicle system. If the TE calculation module receives the instantaneous grade, the TE calculation module may determine or calculate the effective grade. The force required to move or propel the vehicle system at the determined speed may be equal to the mass of the vehicle system multiplied by an acceleration required to achieve the determined speed. The grade force may be determined as the force on the vehicle system due to the grade that the vehicle system may be disposed on. The grade force may be a positive force when the grade may be positive, i.e., when the grade is uphill. The grade force may be negative when the grade may be negative, i.e., when the grade is downhill. The drag force may be determined by, for example, the Davis equation.

The required tractive effort may be computed by an adder module 76 to a current tractive effort 74 that may be provided by a TE feedback module 72. The TE feedback module may receive the current tractive effort from the operator control unit and/or the vehicle system controller(s). The adder module outputs a corrected tractive effort 78 to a throttle setting and brake setting determination module 82. A current speed 80 of the vehicle system may be also provided to the throttle setting and brake setting determination module. The throttle setting and brake setting determination module determines one or more of a throttle setting or a brake setting to apply to change the speed of the vehicle system from the current speed to the determined speed. The throttle setting and brake setting determination module provide one or more of a throttle setting or a brake setting to one or more of the operator control unit or the vehicle system controller(s). The input interface, the throttle lever, and/or the brake lever of the operator control unit may be used to send or communicate a command signal 86 to the onboard controller device of the vehicle system to provide the required tractive effort to move or propel the vehicle system at the determined speed.

According to one embodiment, the vehicle system comprises a plurality of propulsion-generating vehicles and the command signal may be received by one propulsion-generating vehicle that controls the remaining propulsion-generating vehicles synchronously. The remaining propulsion-generating vehicles may be controlled to operate at the same throttle setting and/or brake setting as the propulsion-generating vehicle that receives the command signal.

According to one embodiment, the throttle setting may be maintained for a determined time and/or the brake setting may be maintained for a determined time. For example, the throttle setting and/or the brake setting may be maintained for 1.5 seconds. The system may determine a second grade of the vehicle system at the end of the determined time and during a second determined time after the determined time. The system may adjust one or more of the throttle setting or the brake setting at the end of the determined time to adjust the tractive effort for the second grade.

According to one embodiment, the vehicle system may include a plurality of vehicles and the system may monitor inter-vehicle forces within the vehicle system and control one or more of the propulsion system or the brake system to reduce the inter-vehicle forces or to maintain the inter-vehicle forces within a designated range.

Figure 10:
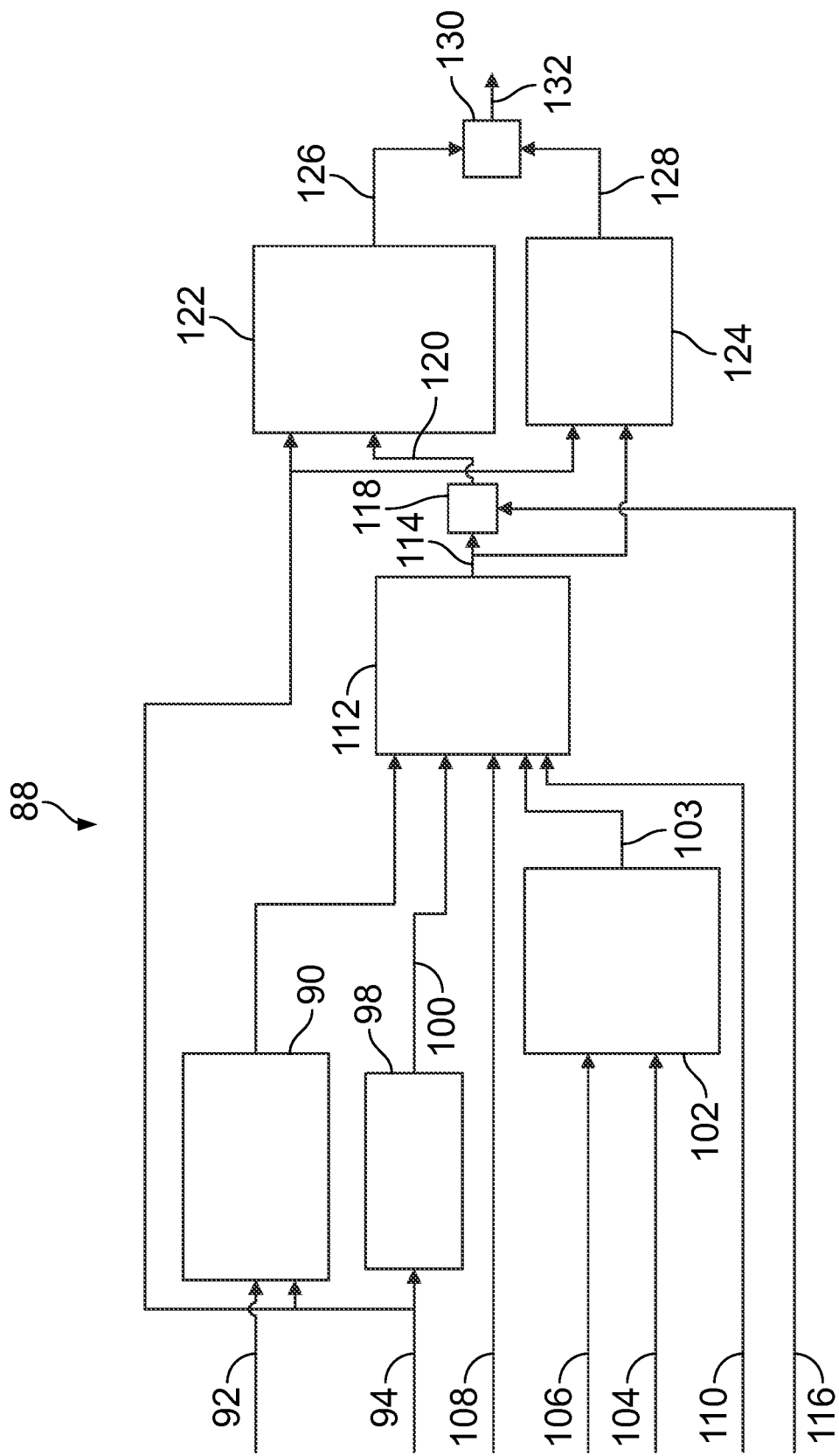
FIG. 10 schematically depicts a system for remotely operating a vehicle system according to one embodiment.

Referring to FIG. 10, a system 88 may include one or more controllers. The one or more controllers may be provided in one or more of the operator control unit or the vehicle system. According to one embodiment, the one or more controllers may be provided in one or more onboard controllers of one or more propulsion-generating vehicles of a vehicle system that includes one or more propulsion-generating vehicles. According to one embodiment, the one or more controllers may be PI controllers. According to one embodiment, the one or more controllers may be PID controllers.

The system may include an acceleration force calculation module 90 to calculate the force required using the required acceleration or deceleration of the vehicle system to travel from a current speed to a determined speed. The acceleration calculation module receives a current speed 92 of the vehicle system and a determined speed 94 at which the vehicle system is to travel. The acceleration force calculation module calculates an acceleration or deceleration required for the vehicle system to go from the current speed to the determined speed. The calculated acceleration may be used to compute or determine the acceleration force using weight 104 of the vehicle system. According to one embodiment, the acceleration force calculation module may calculate a maximum acceleration, or maximum deceleration force.

The system may include a drag force calculation module 98 to calculate a drag force 100 on the vehicle system. The drag force calculation module receives the determined speed to calculate the drag force on the vehicle system at the determined speed. The system may include a grade force calculation module 102 to calculate a grade force 103 on the vehicle system. The grade force calculation module may receive the instantaneous grade or the effective grade and determines or calculates the grade force. If the grade force calculation module receives an instantaneous grade 106 of the vehicle system and a length and weight 104 of the vehicle system to determine or calculate the effective grade which may be used to determine or calculate the grade force.

The system may include a tractive effort calculation module 112 to calculate a required tractive effort 114 to move the vehicle system at the determined speed. The tractive effort calculation module receives the acceleration force calculated by the acceleration calculation module, the drag force calculated by the drag force calculation module, the grade force calculated by the grade force calculation module, the vehicle system weight 110, and a braking force 108 to calculate the required tractive effort. The braking force may be a braking force applied to the wheels of the vehicle system by one or more of the automatic braking system, the independent braking system, or the dynamic braking system of the vehicle system.

The required tractive effort calculated by the tractive effort calculation module may be multiplied by a multiplication module 118 with an efficiency 116 of the tractive effort of the vehicle system on the route it is traveling. The tractive effort 120 obtained from the multiplication module may be provided to a power calculation module 122 along with the determined speed to determine a power 126 required to move or propel the vehicle system at the determined speed. The required tractive effort calculated by the tractive effort calculation module also may be provided to a braking force calculation module 124 along with the determined speed to calculate a braking force 128. The power calculated by the power calculation module and the braking force calculated by the braking force calculation module may be provided to a command signal generation module 130 to generate a command signal 132. The command signal may be sent or communicated to the operator control unit and/or the onboard vehicle controller to determine a throttle setting and/or a brake setting to move or propel the vehicle system at the determined speed. According to one embodiment, the command signal may be used to provide a throttle setting and/or a brake setting on the display of the operator control unit to inform the operator to set the throttle lever and/or the brake lever at the determined setting(s).

Figure 11:
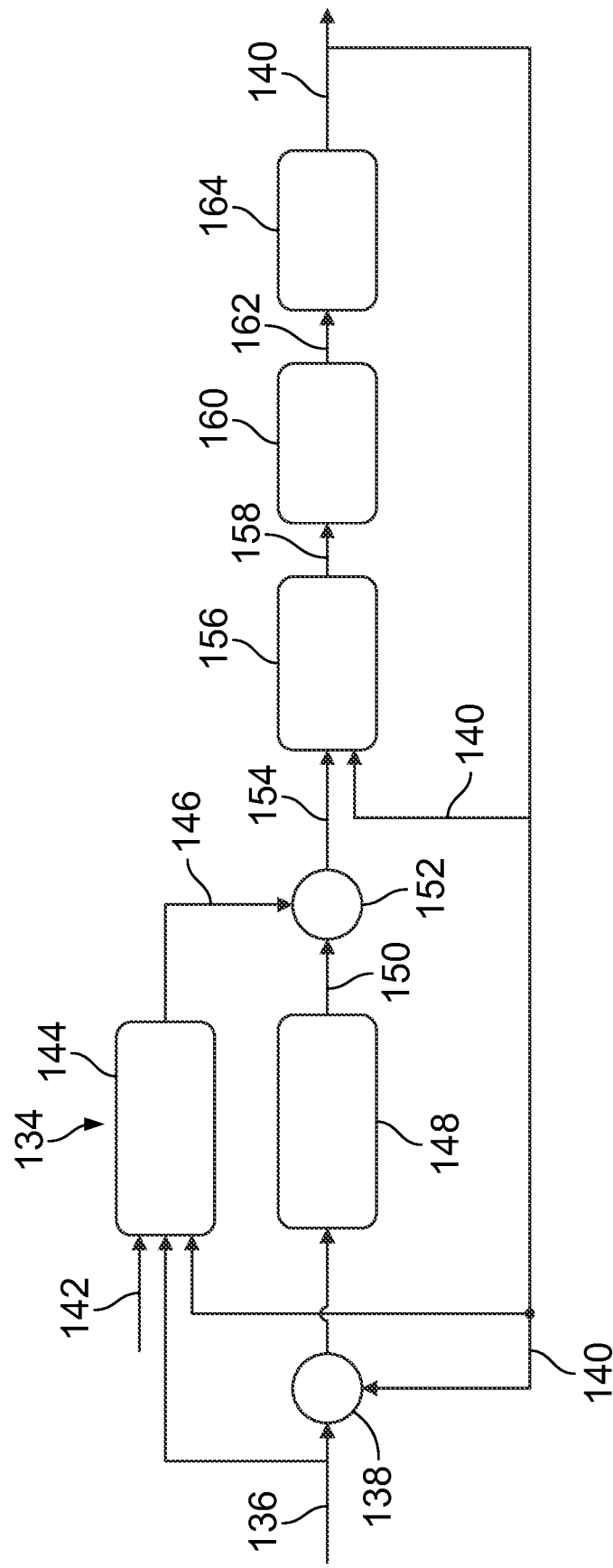
FIG. 11 schematically depicts a system for remotely operating a vehicle system according to one embodiment.

Referring to FIG. 11, a system 134 may include one or more controllers. The one or more controllers may be provided in one or more of the operator control unit or the vehicle system. According to one embodiment, the one or more controllers may be provided in one or more onboard controllers of one or more propulsion-generating vehicles of a vehicle system that includes one or more propulsion-generating vehicles. According to one embodiment, the one or more controllers may be PI controllers. According to one embodiment, the one or more controllers may be PID controllers.

The system may include an adder module 138 to compare a determined speed 136 at which the vehicle system is to move with a current speed 140 that the vehicle system is moving. The determined speed may be provided to a grade impact calculation module 144. The effective grade 142 of the vehicle system also may be provided to the grade impact calculation module. The grade impact correction module calculates a TE grade correction 146. A TE feedback control module 148 determines a TE feedback 150 from the comparison of the determined speed and the current speed of the vehicle system. An adder module 152 determines from the TE grade correction and the TE feedback a required tractive effort 154 that may be provided to a throttle and brake setting determination module 156 along with the current speed. The throttle and brake setting determination module determines a setting 158 for the throttle(s) and/or the brake system(s) that will provide the tractive effort required to move or propel the vehicle system at the determined speed and provides it to an operator control unit 160. The operator control unit sends or communicates a command signal 162 to one or more onboard vehicle controllers 164 to set the throttle(s) and the brake system(s) to the determined setting(s) The operator of the operator control unit may use the input interface, the throttle lever, and/or the brake lever of the operator control unit to set the throttle and/or brake setting(s) and communicate the command signal to one or more onboard vehicle controllers.

Referring to FIG. 12, a system 166 may include one or more controllers 170. The one or more controllers may be provided in one or more of the operator control unit or the vehicle system. According to one embodiment, the one or more controllers may be provided in one or more onboard controllers of one or more propulsion-generating vehicles of a vehicle system that includes one or more propulsion-generating vehicles. According to one embodiment, the one or more controllers may be MPC controllers.

The one or more controllers may include a model 172 that provides a prediction of the tractive effort required for a determined speed of the vehicle system. According to one embodiment, the model may be a model predictive control. According to one embodiment, constraints that the model predictive control satisfies may include the impact or effect that the grade of the vehicle system has on the operation of the vehicle system and a determined time for maintaining one or more of the throttle setting or the brake setting (e.g., the notch dwell and/or the brake dwell). The model predicts from one or more of a throttle setting or a brake setting, vehicle length, weight 104 of the vehicle, 168 a tractive effort and/or expected speed of the vehicle system. The predicted tractive effort 176 may be sent to an optimization routine 174 that determines one or more of a throttle setting or a brake setting 180 required to provide a tractive effort that will move or propel the vehicle system at a determined speed. The required throttle setting and/or brake setting may be sent to one or more controllers 182 of one or more of the operator control unit or the vehicle system. The optimization routine determines optimum control actions 178 that provide the predicted tractive effort from the model.

According to one embodiment, the model may be run and implemented at a determined time interval. According to one embodiment the time interval may be 30 seconds. According to one embodiment the time interval may be 60 seconds.

Referring to FIG. 13, a system 184 may include one or more controllers. The one or more controllers may be provided in one or more of the operator control unit or the vehicle system. According to one embodiment, the one or more controllers may be provided in one or more onboard controllers of one or more propulsion-generating vehicles of a vehicle system that includes one or more propulsion-generating vehicles. According to one embodiment, the one or more controllers may be PI controllers. According to one embodiment, the one or more controllers may be PID controllers.

In the system of FIG. 13, a regulator 186 may be provided to feedback a current speed 190 of the vehicle system to the control of the throttle setting and/or the brake setting. The output 188 of the regulator may be used to adjust the throttle setting and/or brake setting provided by the model of the controller to move or propel the vehicle system at the determined speed. According to one embodiment, the model may be run and implemented at a determined time interval. According to one embodiment the time interval may be 60 seconds. According to one embodiment the time interval may be 120 seconds.

Figure 14:
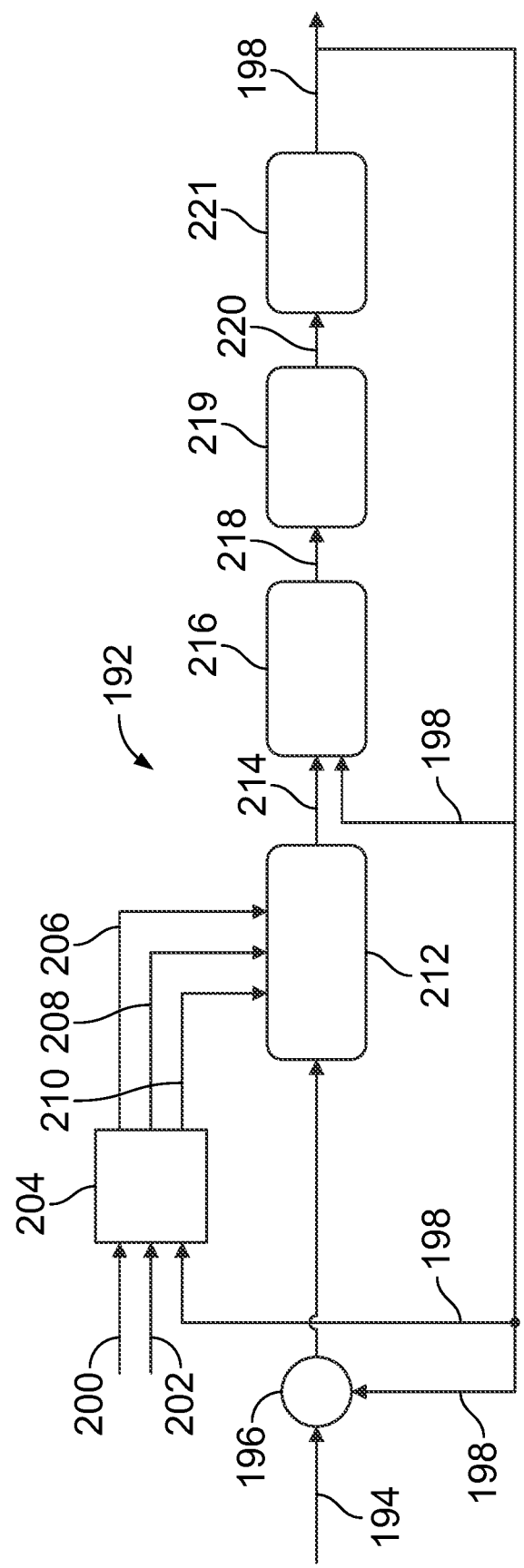
FIG. 14 schematically depicts a system for remotely operating a vehicle system according to one embodiment.

Referring to FIG. 14, a system 192 may include one or more controllers. The one or more controllers may be provided in one or more of the operator control unit or the vehicle system. According to one embodiment, the one or more controllers may be provided in one or more onboard controllers of one or more propulsion-generating vehicles of a vehicle system that includes one or more propulsion-generating vehicles. According to one embodiment, the one or more controllers may be PI controllers. According to one embodiment, the one or more controllers may be PID controllers.

The system may include a comparison module 196 to compare a determined speed 194 at which the vehicle system is to move with a current speed 198 that the vehicle system is moving. The determined speed may be provided to a gain schedule module 144. The effective grade 200 of the vehicle system and the vehicle system weight 202 may be also provided to the gain schedule module. The gain schedule module schedules a control gain, including a proportional game 206, an integral gain 208, and/or a derivative gain 210 for a controller 212. According to one embodiment, the controller may be a PI controller. According to one embodiment the controller may be a PID controller. The controller determines a required tractive effort 214 that may be provided to a throttle and brake setting determination module 216 along with the current speed. The throttle and brake setting determination module determines a setting 218 for the throttle(s) and/or the brake system(s) that will provide the tractive effort required to move or propel the vehicle system at the determined speed and provides it to an operator control unit 219. The operator control unit sends or communicates a command signal 220 to one or more onboard vehicle controllers 221 to set the throttle(s) and the brake system(s) to the determined setting(s) The operator of the operator control unit may use the input interface, the throttle lever, and/or the brake lever of the operator control unit to set the throttle and/or brake setting(s) and communicate the command signal to one or more onboard vehicle controllers.

Figure 15:
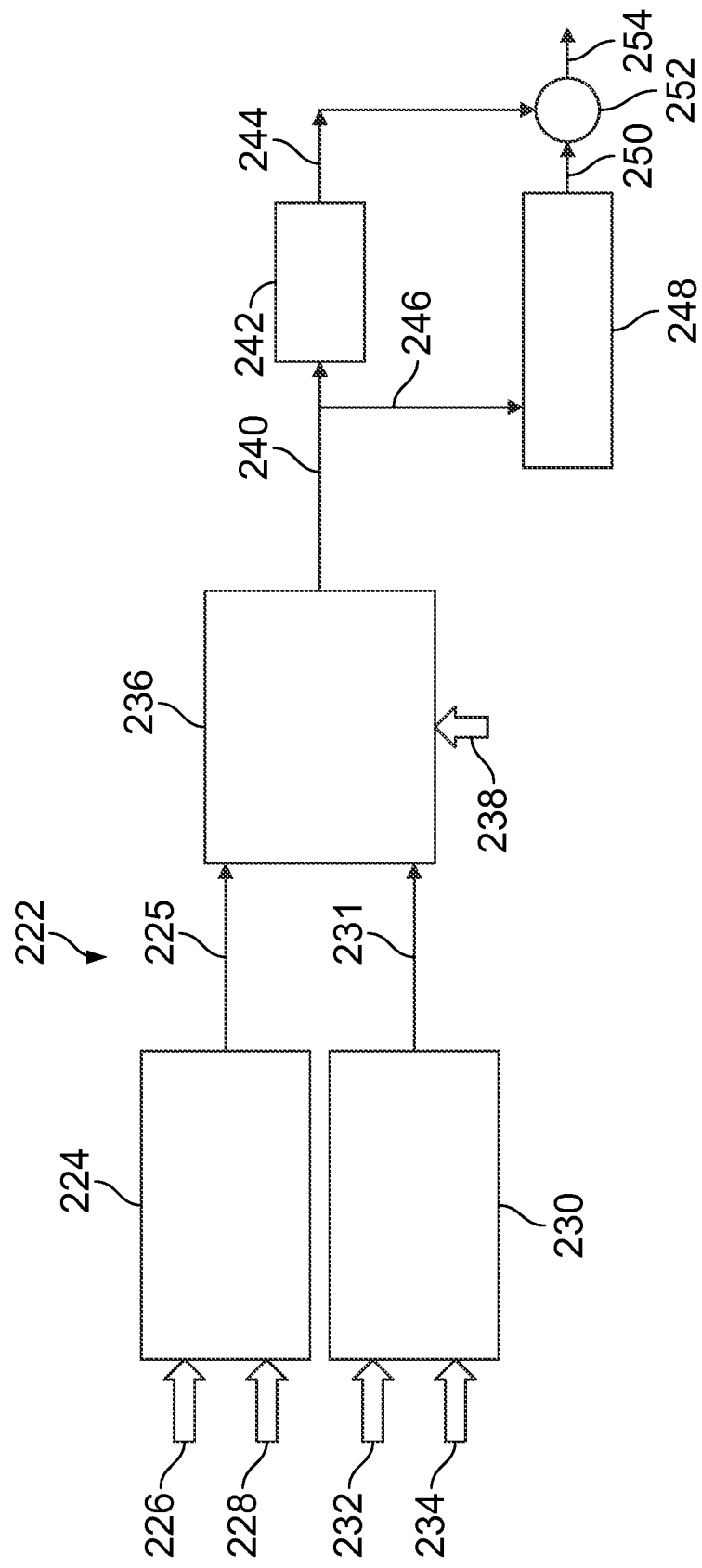
FIG. 15 schematically depicts a system for remotely operating a vehicle system according to one embodiment.

Referring to FIG. 15, a system 256 may include one or more controllers. The one or more controllers may be provided in one or more of the operator control unit or the vehicle system. According to one embodiment, the one or more controllers may be provided in one or more onboard controllers of one or more propulsion-generating vehicles of a vehicle system that includes one or more propulsion-generating vehicles. According to one embodiment, the one or more controllers may be PI controllers. According to one embodiment, the one or more controllers may be PID controllers.

The system may include a grade calculation module 224 to calculate a first grade of the vehicle system. The grade calculation module may receive measurements 226 to calculate the first grade. The measurements may include measurements obtained from instruments, for example from barometers provided on vehicles of the vehicle system or from GNSS instruments. The grade calculation module may be provided with configuration parameters 228 for calculation of the first grade. The configuration parameters may include an initial grade of the vehicle system and/or a parameter(s) representative of the accuracy of the instruments that provide the measurements. The grade calculation module may calculate the first grade 225 of the vehicle system and may calculate a grade(s) of the vehicle system for an upcoming portion of the route the vehicle system may be traveling. The first grade calculated by the grade calculation module may include an error band as a measurement of a worst-case error of the calculated first grade.

The system may include a grade estimation module 230 to estimate a second grade of the vehicle system. The grade estimation module may receive measurements 234 to estimate the second grade. The measurements may include a current speed of the vehicle system, a throttle setting(s), a brake setting(s), a tractive effort, and/or a power of the vehicle system. The grade estimation module may be provided with configuration parameters 232 for estimation of the second grade. The configuration parameters may include the mass or weight of the vehicle system, the number of propulsion-generating vehicles of the vehicle system, the number of non-propulsion-generating vehicles of the vehicle system, a parameter(s) representative of the accuracy of instruments (e.g., barometers and/or GNSS) used to provide measurements, Davis coefficients, and/or drag coefficients. The grade estimation module may estimate the second grade 231 of the vehicles system and may estimate a grade(s) of the vehicle system for an upcoming portion of the route the vehicle system may be traveling. The second grade estimated by the grade estimation module may include an error band as a measurement of a worst-case error of the estimated second grade.

The system may include a corrected grade determination module 236 to determine a corrected or effective grade 240 of the vehicle system from the calculated first grade and the estimated second grade. The corrected grade determination module may use Artificial Intelligence (AI), Machine Learning (ML), or heuristic learning to determine the corrected grade. The corrected grade determination module may use tuning parameters 238 in determining the corrected grade. The tuning parameters may include confidence factors and/or weights applied to the measurements, configuration parameters, and/or coefficients used by the system to determine the grades of the vehicle system. The corrected or effective grade may be a weighted average of the first and second grades.

The corrected grade may be provided to a TE calculation module 242 to determine a tractive effort 244 required to move or propel the vehicle system at a determined speed. According to one embodiment, the system may include a feedback control module 248 that determines a grade 246 according to the error band of the corrected grade. The feedback control module determines a corrected tractive effort 250 that may be added to the tractive effort 244 by an adder module 252. A command signal 254 may be provided to the operator control unit and/or the onboard vehicle controller(s) to provide a throttle(s) and/or brake system(s) setting to provide the tractive effort to move or propel the vehicle system at the determined speed.

Figure 16:
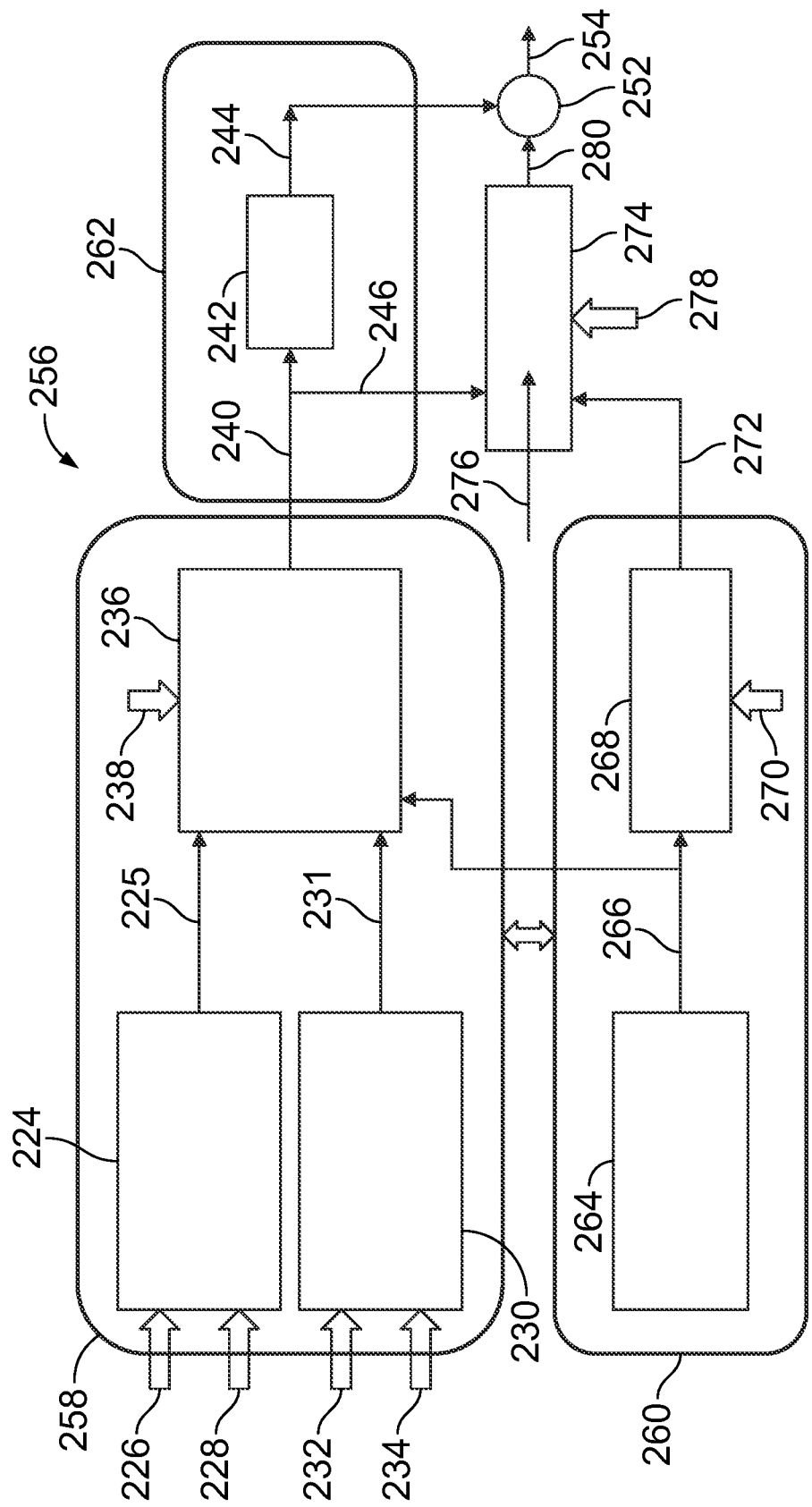

Referring to FIG. 16, a system 256 may include one or more controllers. The one or more controllers may be provided in one or more of the operator control unit or the vehicle system. According to one embodiment, the one or more controllers may be provided in one or more onboard controllers of one or more propulsion-generating vehicles of a vehicle system that includes one or more propulsion-generating vehicles. According to one embodiment, the one or more controllers may be PI controllers. According to one embodiment, the one or more controllers may be PID controllers.

The system may include a grade calculation and estimation module 258 and a learned grade module 260. The system may include a database 264 that includes grade information. The database may be onboard the vehicle system or remote from the vehicle system. The grade information of the database may be accessible by the operator control unit and/or the onboard vehicle controller of the vehicle system. According to one embodiment, the database may be included in a PTC system of the vehicle system. The database may also include grade information learned by the vehicle system, for example while operating on routes within a transportation network.

A third grade 266 may be obtained from the database and provided to the corrected grade determination module. The third grade may be provided to the corrected grade determination module. The corrected grade determination module may determine the corrected grade from the first calculated grade, the second estimated grade, and the third grade obtained from the database.

The third grade may be provided to a prediction control module 268 that determines an upcoming grade(s) of the vehicle system as it travels on the route. The prediction control module includes tuning parameters 270 that may include confidence factors and/or weights applied to the measurements, configuration parameters, and/or coefficients used by the system to determine the grades of the vehicle system. The prediction control module may provide a predicted grade 272 to an operator control unit 274. The operator control unit may be used to set a determined speed 276 of the vehicle system.

The operator control unit may determine from the predicted grade and the determined speed a tractive effort 280 required to move or propel the vehicle system at the determined speed. The operator control unit may include configuration and tuning parameters 278 to determine the required tractive effort. The configuration and tuning parameters may include throttle and/or brake system threshold settings and dwell times. The configuration and tuning parameters may include a mass or weight of the vehicle system and parameters of the PID controller(s). The required tractive effort determined by the operator control unit may be compared to the tractive effort calculated by the TE calculation module by the adder module to provide a command signal from the operator control unit to set the throttle(s) and/or brake system(s) of the vehicle system to move or propel the vehicle system at the determined speed.

Figure 17:
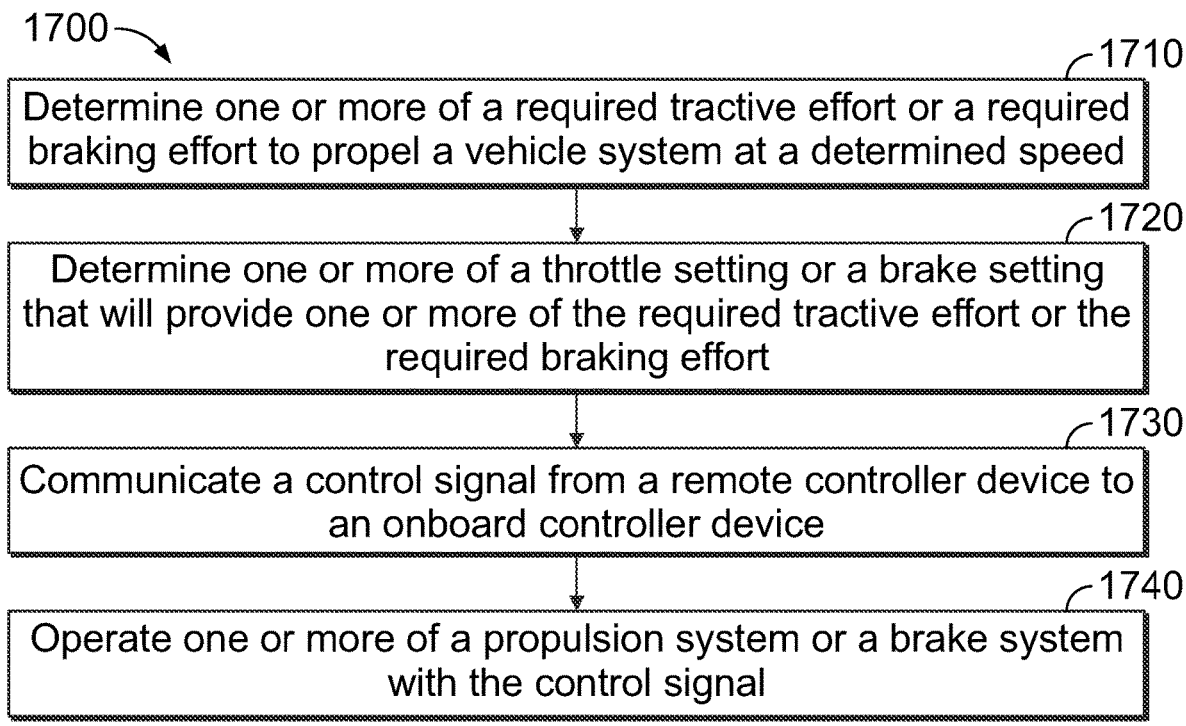
FIG. 17 schematically depicts a method according to one embodiment.

Referring to FIG. 17, a method 1700 may include a step 1710 of determining one or more of a required tractive effort or a required braking effort to propel a vehicle system at a determined speed and a step 1720 of determining one or more of a throttle setting of a propulsion system or a brake setting of a brake system of the vehicle system that will provide one or more of the required tractive effort or the required braking effort. The method may include a step 1730 of communicating a control signal from a remote controller device to an onboard controller device of the vehicle system and a step 1740 of operating one or more of the propulsion systems at the throttle setting or the brake system at the brake setting with the control signal to move the vehicle system at the determined speed.

Figure 18:
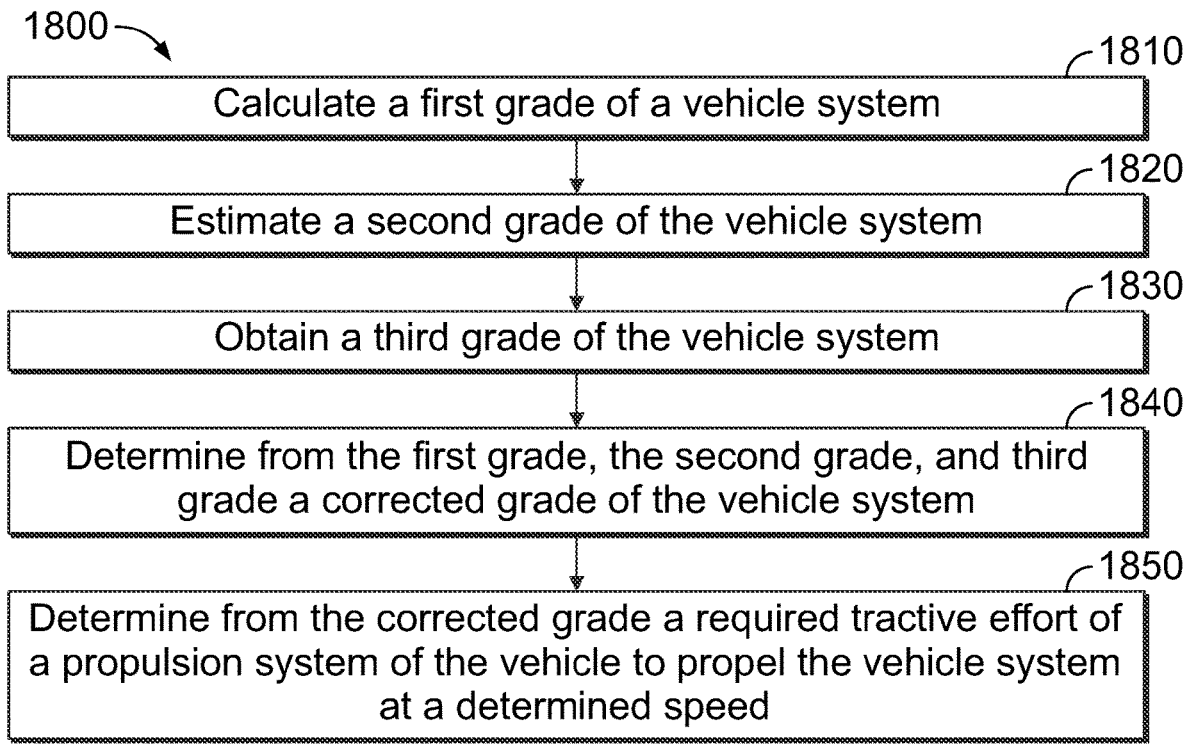
FIG. 18 schematically depicts a method according to one embodiment.

Referring to FIG. 18, a method 1800 may include a step 1810 of calculating a first grade of a vehicle system, the vehicle system comprising a propulsion system and a plurality of vehicles and a step 1820 of estimating a second grade of the vehicle system. The method may include a step 1830 of obtaining a third grade of the vehicle system from a database and a step 1840 of determining from the first grade, the second grade, and third grade, a corrected grade of the vehicle system. The method may include a step 1850 of determining from the corrected grade a required tractive effort of the propulsion system to propel the vehicle system at a determined speed.

A method may include determining one or more of a required tractive effort or a required braking effort to propel a vehicle system at a determined speed and determining one or more of a throttle setting of a propulsion system or a brake setting of a brake system of the vehicle system that will provide one or more of the required tractive effort or the required braking effort. The method may include communicating a control signal from a remote controller device to an onboard controller device of the vehicle system and operating one or more of the propulsion systems at the throttle setting or the brake system at the brake setting with the control signal to move the vehicle system at the determined speed.

The method may include determining a current tractive effort of the propulsion system or a current braking effort of the brake system and determining a difference between one or more of the required tractive effort and the current tractive effort or the required braking effort and the current braking effort. The method may include controlling one or more of the propulsion systems to change the current tractive effort to the required tractive effort or the brake system to change the current braking effort to the required braking effort.

Determining one or more of the current tractive effort of the propulsion system or the current braking effort of the brake system may include determining a grade on which the vehicle system may be disposed. The method may include adjusting one or more of the current tractive effort or the current braking effort based on the grade on which the vehicle system is disposed.

Determining the required tractive effort may include determining an acceleration of the vehicle system, an effective grade of the vehicle system, and a drag force on the vehicle system.

Determining the effective grade may include determining a grade on which the vehicle system may be disposed, a length of the vehicle system, and a weight of the vehicle system.

Determining the grade on which the vehicle system may be disposed may include one or more of obtaining the grade from a database or determining the grade from one or more measurement devices.

Obtaining the grade from a database comprises obtaining grade information of a route the vehicle system may be traveling for a determined upcoming distance at a determined time interval.

The determined upcoming distance may be five miles and the determined time interval may be one minute.

One or more measurement devices may include one or more of a barometer or a navigation instrument to determine a geographic location of the vehicle system.

Operating one or more of the propulsion system at the throttle setting or the brake system at the brake setting with the control signal may include maintaining one or more of the throttle setting or the brake setting for a determined time. The method may include determining the effective grade of the vehicle system at an end of the determined time.

Determining the effective grade at the end of the determined time may include determining a grade on which the vehicle system will be disposed at the end of the determined time from a database.

The method may include adjusting one or more of the throttle setting or the brake setting at the end of the determined time based on the effective grade.

Operating one or more of the propulsion system at the throttle setting or the brake system at the brake setting with the control signal may include maintaining one or more of the throttle setting or the brake setting for a determined time.

The method may include determining an average or a maximum or a median of a second effective grade of the vehicle system for a second determined time after the determined time.

Determining one or more of the throttle setting of the propulsion system or the brake setting of the brake system of the vehicle system that will provide the required tractive effort and the determined speed may include performing an optimization routine to determine one or more of the throttle setting or the brake setting.

The method may include determining a current speed of the vehicle system and determining one or more of a current tractive effort of the propulsion system or a current braking effort of the brake system. The method may include controlling one or more of the propulsion system or the brake system to change one or more of the current tractive effort to the required tractive effort or the current braking effort to the required braking effort and change the current speed to the determined speed.

Determining the required tractive effort may include scheduling a control gain that may be output by a proportional-integral-derivative (PID) controller, wherein the PID controller gains may be based on the effective grade, the weight of the vehicle system, and the determined speed.

The method may include determining a maximum acceleration to the determined speed.

The vehicle system may include multiple propulsion-generating vehicles and the propulsion system of the vehicle system may include multiple vehicle propulsion systems. Controlling the propulsion system with the control signal may include synchronously controlling the multiple vehicle propulsion systems.

The vehicle system may include multiple vehicles. The method may include monitoring inter-vehicle forces within the vehicle system and controlling one or more of the propulsion system or the brake system of the vehicle system to one or more of reduce the inter-vehicle forces or maintain the inter-vehicle forces within a designated range.

A system may include one or more controllers. The one or more controllers may determine one or more of a required tractive effort or a required braking effort to propel a vehicle system at a determined speed and determine one or more of a throttle setting of a propulsion system or a brake setting of a brake system of the vehicle system that will provide one or more of the required tractive effort or the required braking effort. The one or more controllers may communicate a control signal from a remote controller device to an onboard controller device of the vehicle system and operate one or more of the propulsion system at the throttle setting or the brake system at the brake setting with the control signal to move the vehicle system at the determined speed.

The one or more controllers may determine a current tractive effort of the propulsion system or a current braking effort of the brake system and determine a difference between one or more of the required tractive effort and the current tractive effort or the required braking effort and the current braking effort. The one or more controllers may control one or more of the propulsion system to change the current tractive effort to the required tractive effort or the brake system to change the current braking effort to the required braking effort.

To determine one or more of the current tractive effort of the propulsion system or the current braking effort of the brake system, the one or more controllers may determine a grade on which the vehicle system may be disposed and adjust one or more of the current tractive effort or the current braking effort based on the grade on which the vehicle system may be disposed.

To determine the required tractive effort, the one or more controllers may determine an acceleration of the vehicle system, an effective grade of the vehicle system, and a drag force on the vehicle system.

To determine the effective grade, the one or more controllers may determine a grade on which the vehicle system may be disposed, a length of the vehicle system, and a weight of the vehicle system.

To determine the grade on which the vehicle system may be disposed, the one or more controllers may one or more of obtain the grade from a database or determine the grade from one or more measurement devices.

To obtain the grade from a database, the one or more controllers may obtain grade information of a route the vehicle system may be traveling for a determined upcoming distance at a determined time interval.

The determined upcoming distance may be five miles and the determined time interval may be one minute.

The one or more measurement devices may include one or more of a barometer or a navigation instrument to determine a geographic location of the vehicle system.

To operate one or more of the propulsion system at the throttle setting or the brake system at the brake setting with the control signal, the one or more controllers may maintain one or more of the throttle setting or the brake setting for a determined time and determine the effective grade of the vehicle system at an end of the determined time.

To determine the effective grade at the end of the determined time the one or more controllers may determine a grade on which the vehicle system will be disposed at the end of the determined time from a database.

The one or more controllers may adjust one or more of the throttle setting or the brake setting at the end of the determined time based on the effective grade.

To operate one or more of the propulsion system at the throttle setting or the brake system at the brake setting with the control signal, the one or more controllers may maintain one or more of the throttle setting or the brake setting for a determined time and determine an average or a maximum or a median of a second effective grade of the vehicle system for a second determined time after the determined time.

To determine one or more of the throttle setting of the propulsion system or the brake setting of the brake system of the vehicle system that will provide the required tractive effort and the determined speed, the one or more controllers may perform an optimization routine to determine one or more of the throttle setting or the brake setting.

The one or more controllers may determine a current speed of the vehicle system, determine one or more of a current tractive effort of the propulsion system or a current braking effort of the brake system, and control one or more of the propulsion system or the brake system to change one or more of the current tractive effort to the required tractive effort or the current braking effort to the required braking effort and change the current speed to the determined speed.

To determine the required tractive effort, the one or more controllers may schedule a control gain that may be output by a proportional-integral-derivative (PID) controller, wherein the PID controller gains may be based on the effective grade, the weight of the vehicle system, and the determined speed.

The one or more controllers may determine a maximum acceleration to the determined speed.

The vehicle system may include multiple propulsion-generating vehicles and the propulsion system of the vehicle system may include multiple vehicle propulsion systems Controlling the propulsion system with the control signal may include synchronously controlling the multiple vehicle propulsion systems.

The vehicle system may include multiple vehicles, and the one or more controllers may monitor inter-vehicle forces within the vehicle system and control one or more of the propulsion system or the brake system of the vehicle system to one or more of reduce the inter-vehicle forces or maintain the inter-vehicle forces within a designated range.

A method may include calculating a first grade of a vehicle system, the vehicle system comprising a propulsion system and a plurality of vehicles and estimating a second grade of the vehicle system. The method may include obtaining a third grade of the vehicle system from a database and determining from the first grade, the second grade, and third grade, a corrected grade of the vehicle system. The method may include determining from the corrected grade a required tractive effort of the propulsion system to propel the vehicle system at a determined speed.

Calculating the first grade of the vehicle system may include determining the grade of at least two vehicles of the vehicle system.

Determining the grade of the at least two vehicles of the vehicle system may include determining the grade of the at least two vehicles from measurement devices onboard the two or more vehicles.

The measurement devices may include barometers or navigation instruments configured to determine a geographic location of the at least two vehicles.

Estimating the second grade of the vehicle system may include estimating the second grade from one or more measurement devices, a number of vehicles of the vehicle system, a weight of the vehicle system, a drag force on the vehicle system, and coefficients of the Davis equation.

Obtaining the third grade from the database may include obtaining grade information of a route the vehicle system may be traveling for a determined upcoming distance at a determined time interval.

The determined upcoming distance may be five miles and the determined interval may be one minute.

Determining the corrected grade may include determining a weighted average of the first grade, the second grade, and the third grade.

Determining the corrected grade may include determining the corrected grade with a heuristic learning model.

The method may include communicating a control signal from a remote controller device to an onboard controller device of the vehicle system and controlling the propulsion system at the throttle setting with the control signal to move the vehicle system at the determined speed.

Setting the remote controller device to the throttle setting may include maintaining the throttle for a determined time. The method may include determining the corrected grade of the vehicle system at an end of the determined time.

The method may include adjusting the throttle setting at the end of the determined time based on the effective grade.

In one embodiment, the control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that may be non-convex. In one embodiment, the neural network has a set of parameters representing weights of its node connections. Several copies of this network may be generated and then different adjustments to the parameters may be made, and simulations may be done. Once the output from the various models are obtained, they may be evaluated on their performance using a determined success metric. The best model may be selected, and the vehicle controller executes that plan to achieve the desired input data to mirror the predicted best outcome scenario. Additionally, the success metric may be a combination of the optimized outcomes, which may be weighed relative to each other.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

The above description is illustrative, and not restrictive. For example, the above-described embodiments (and/or aspects thereof) may be used in combination with each other. In addition, many modifications may be made to adapt a particular situation or material to the teachings of the subject matter without departing from its scope. While the dimensions and types of materials described herein define the parameters of the subject matter, they are exemplary embodiments. Other embodiments will be apparent to one of ordinary skill in the art upon reviewing the above description. The scope of the subject matter should, therefore, be determined with reference to the appended claims, along with the full scope of equivalents to which such claims are entitled.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

A reference herein to a patent document or any other matter identified as prior art, is not to be taken as an admission that the document or other matter was known or that the information it contains was part of the common general knowledge as at the priority date of any of the claims.

What is claimed is:

1. A method comprising:
   determining one or more of a required tractive effort or a required braking effort to propel a vehicle system at a determined speed;
   determining one or more of a throttle setting of a propulsion system or a brake setting of a brake system of the vehicle system that will provide one or more of the required tractive effort or the required braking effort;
   communicating a control signal from a remote controller device to an onboard controller device of the vehicle system; and
   operating one or more of the propulsion systems at the throttle setting or the brake system at the brake setting with the control signal to move the vehicle system at the determined speed.

2. The method of claim 1, further comprising:
   determining a current tractive effort of the propulsion system or a current braking effort of the brake system;
   determining a difference between one or more of the required tractive effort and the current tractive effort or the required braking effort and the current braking effort; and
   controlling one or more of the propulsion systems to change the current tractive effort to the required tractive effort or the brake system to change the current braking effort to the required braking effort.

3. The method of claim 2, wherein determining one or more of the current tractive effort of the propulsion system or the current braking effort of the brake system comprises determining a grade on which the vehicle system is disposed, and the method further comprises:
   adjusting one or more of the current tractive effort or the current braking effort based on the grade on which the vehicle system is disposed.

4. The method of claim 1, wherein determining the required tractive effort comprises:
   determining an acceleration of the vehicle system, an effective grade of the vehicle system, and a drag force on the vehicle system.

5. The method of claim 4, wherein determining the effective grade comprises determining a grade on which the vehicle system is disposed, a length of the vehicle system, and a weight of the vehicle system.

6. The method of claim 5, wherein determining the grade on which the vehicle system is disposed comprises one or more of obtaining the grade from a database or determining the grade from one or more measurement devices.

7. The method of claim 6, wherein obtaining the grade from a database comprises obtaining grade information of a route the vehicle system is traveling for a determined upcoming distance at a determined time interval.

8. A system comprising:
   one or more controllers configured to:
   determine one or more of a required tractive effort or a required braking effort to propel a vehicle system at a determined speed;
   determine one or more of a throttle setting of a propulsion system or a brake setting of a brake system of the vehicle system that will provide one or more of the required tractive effort or the required braking effort;
   communicate a control signal from a remote controller device to an onboard controller device of the vehicle system; and
   operate one or more of the propulsion system at the throttle setting or the brake system at the brake setting with the control signal to move the vehicle system at the determined speed.

9. The system of claim 8, wherein the one or more controllers are further configured to:
- determine a current tractive effort of the propulsion system or a current braking effort of the brake system;
- determine a difference between one or more of the required tractive effort and the current tractive effort or the required braking effort and the current braking effort; and
- control one or more of the propulsion system to change the current tractive effort to the required tractive effort or the brake system to change the current braking effort to the required braking effort.

10. The system of claim 9, wherein to determine one or more of the current tractive effort of the propulsion system or the current braking effort of the brake system the one or more controllers are configured to:
- determine a grade on which the vehicle system is disposed; and
- adjust one or more of the current tractive effort or the current braking effort based on the grade on which the vehicle system is disposed.

11. The system of claim 8, wherein to determine the required tractive effort the one or more controllers are configured to:
- determine an acceleration of the vehicle system, an effective grade of the vehicle system, and a drag force on the vehicle system.

12. The system of claim 11, wherein to determine the effective grade the one or more controllers are configured to:
- determine a grade on which the vehicle system is disposed, a length of the vehicle system, and a weight of the vehicle system.

13. The system of claim 12, wherein to determine the grade on which the vehicle system is disposed the one or more controllers are configured to:
- one or more of obtain the grade from a database or determine the grade from one or more measurement devices.

14. The system of claim 13, wherein to obtain the grade from a database the one or more controllers are configured to:
- obtain grade information of a route the vehicle system is traveling for a determined upcoming distance at a determined time interval.

15. The system of claim 14, wherein the determined upcoming distance is five miles, and the determined time interval is one minute.

16. The system of claim 13, wherein the one or more measurement devices comprises one or more of a barometer or a navigation instrument configured to determine a geographic location of the vehicle system.

17. A method, comprising:
- calculating a first grade of a vehicle system, the vehicle system comprising a propulsion system and a plurality of vehicles;
- estimating a second grade of the vehicle system;
- obtaining a third grade of the vehicle system from a database;
- determining from the first grade, the second grade, and third grade, a corrected grade of the vehicle system; and
- determining from the corrected grade a required tractive effort of the propulsion system to propel the vehicle system at a determined speed.

18. The method of claim 17, wherein calculating the first grade of the vehicle system comprises determining the grade of at least two vehicles of the vehicle system.

19. The method of claim 18, wherein determining the grade of the at least two vehicles of the vehicle system comprises determining the grade of the at least two vehicles from measurement devices onboard the at least two vehicles.

20. The method of claim 19, wherein the measurement devices comprise barometers or navigation instruments configured to determine a geographic location of the at least two vehicles.

* * * * *